US012330125B2

(12) United States Patent
Mizuyoke

(10) Patent No.: US 12,330,125 B2
(45) Date of Patent: Jun. 17, 2025

(54) MIXING BLADE AND MIXING APPARATUS FOR LIQUIDS

(71) Applicant: Mizuyoke Co., Ltd., Ibaraki (JP)

(72) Inventor: Yoshimi Mizuyoke, Koga (JP)

(73) Assignee: Mizuyoke Co., Ltd., Ibaraki (JP)

( * ) Notice: Subject to any disclaimer, the term of this patent is extended or adjusted under 35 U.S.C. 154(b) by 457 days.

(21) Appl. No.: 17/779,928

(22) PCT Filed: Mar. 31, 2022

(86) PCT No.: PCT/JP2022/016725
§ 371 (c)(1),
(2) Date: May 25, 2022

(87) PCT Pub. No.: WO2022/215656
PCT Pub. Date: Oct. 13, 2022

(65) Prior Publication Data
US 2023/0128561 A1 Apr. 27, 2023

(30) Foreign Application Priority Data
Apr. 7, 2021 (JP) ................................ 2021-065355

(51) Int. Cl.
*B01F 25/43* (2022.01)
*B01F 25/4314* (2022.01)

(52) U.S. Cl.
CPC .. *B01F 25/4314* (2022.01); *B01F 2215/0431* (2013.01)

(58) Field of Classification Search
CPC .................... B01F 25/4314; B01F 2215/0431
USPC .......................................................... 366/339
See application file for complete search history.

(56) References Cited

U.S. PATENT DOCUMENTS 3,949,970 A 4/1976 ter Braak
4,384,787 A 5/1983 Ito et al.
7,871,193 B2 1/2011 Brod et al.
2007/0237024 A1* 10/2007 Brod ...................... B01F 27/85 366/241

FOREIGN PATENT DOCUMENTS

DE 72 34 116 U 1/1977
GB 1 386 955 A 12/1975
JP 48-29057 4/1973
JP 56-62534 5/1981
(Continued)

OTHER PUBLICATIONS

English Translation of Written Opinion of the International Searching Authority, International Application No. PCT/JP2022/016725, issued Jun. 21, 2022.
(Continued)

*Primary Examiner* — Mark A Laurenzi
*Assistant Examiner* — Kelsey L Stanek
(74) *Attorney, Agent, or Firm* — Greenblum & Bernstein, P.L.C.

(57) ABSTRACT

A mixing blade comprises a first blade, at least one second blade. The first blade is spirally formed around a first shaft. The at least one second blade is twisted around a second axis parallel to the first shaft. The second blade is provided between facing blade portions in the first blade. The facing blade portions faces each other in a direction of the first shaft.

14 Claims, 35 Drawing Sheets

(56) References Cited

FOREIGN PATENT DOCUMENTS

| | | | | | |
|---|---|---|---|---|---|
| JP | 60-144929 | | | 9/1985 | |
| JP | 2-39048 | | | 3/1990 | |
| JP | 2004-16970 | | | 1/2004 | |
| JP | 2011144038 | A | * | 7/2011 | |
| JP | 2022-64873 | | | 4/2022 | |
| WO | 97/00122 | | | 1/1997 | |
| WO | WO-9700122 | A1 | * | 1/1997 | ............ B01F 5/0614 |

OTHER PUBLICATIONS

Extended European Search Report in corresponding European Patent Application No. 22723535.5, issued on Feb. 5, 2024.

International Search Report, International Application No. PCT/JP2022/016725, issued Jun. 21, 2022.

Written Opinion of the International Searching Authority, International Application No. PCT/JP2022/016725, issued Jun. 21, 2022.

* cited by examiner

MIXING BLADE AND MIXING APPARATUS FOR LIQUIDS

BACKGROUND OF THE INVENTION

Field of the Invention

The present invention relates to a mixing blade and a mixing apparatus for mixing liquids.

Description of the Related Art

A stirring element 2 including a first spiral strip 21 and a second spiral strip 22 is known. The outer edge portion of the first spiral strip 21 is fixed to the inner edge portion of the second spiral strip 22 so that they bite into each other. The first spiral strip 21 spirally swirls the fluid in one direction around the axis over the substantially entire length of a housing 1, and the second spiral strip 22 is provided so that it is wound around the outer circumferential side of the spiral strip, and spirally swirls the fluid in the other direction around the axis over the substantially entire length of the housing (Patent Literature 1).

Patent Literature 1: Japanese Patent Laid-Open No. 2004-16970

SUMMARY OF THE INVENTION

However, the conventional configuration may not be capable of sufficiently mixing a plurality of fluids.

An object of the present invention, which has been made in view of the above problem, is to obtain a mixing blade and a mixing apparatus capable of sufficiently mixing a plurality of liquids.

A mixing blade according to a first aspect of the invention of the present application includes: a first blade spirally formed around a first shaft; and at least one second blade twisted around a second axis parallel to the first shaft, in which the second blade is provided between facing blade portions in the first blade, the facing blade portions facing each other in a direction of the first shaft.

It is preferable that the first shaft have a cylindrical shape, and the at least one second blade be provided between the first shaft and an outer end of the first blade.

It is preferable that a plurality of the second blades be provided, and an interval between the second blades in a circumference of the first shaft be one time or more and less than two times a diameter of each second blade.

It is preferable that the first blade be wound around the first shaft by at least 5/3 turns.

It is preferable that the at least one second blade be twisted half a turn around the second axis.

It is preferable that the second blades be twisted in the same direction.

It is preferable that the number of the second blades be plural, and a direction in which each of the second blades is twisted be clockwise or counterclockwise with respect to the second axis.

The mixing apparatus according to a second aspect of the invention of the present application includes the mixing blade and a housing tube housing the mixing blade.

It is preferable that a ratio L/D' of a second blade length L to an effective inner diameter D' is preferably 2 or more and 7 or less, and more preferably 4 or more and 7 or less, the second blade length L being a length of a portion where at least one second blade is provided in a direction of the first shaft, the effective inner diameter D' being an inner diameter obtained by subtracting a diameter of the first shaft from an inner diameter of the housing tube.

According to the present invention, a mixing blade and a mixing apparatus capable of sufficiently mixing a plurality of liquids are obtained.

DESCRIPTION OF EMBODIMENTS

Figure 1:
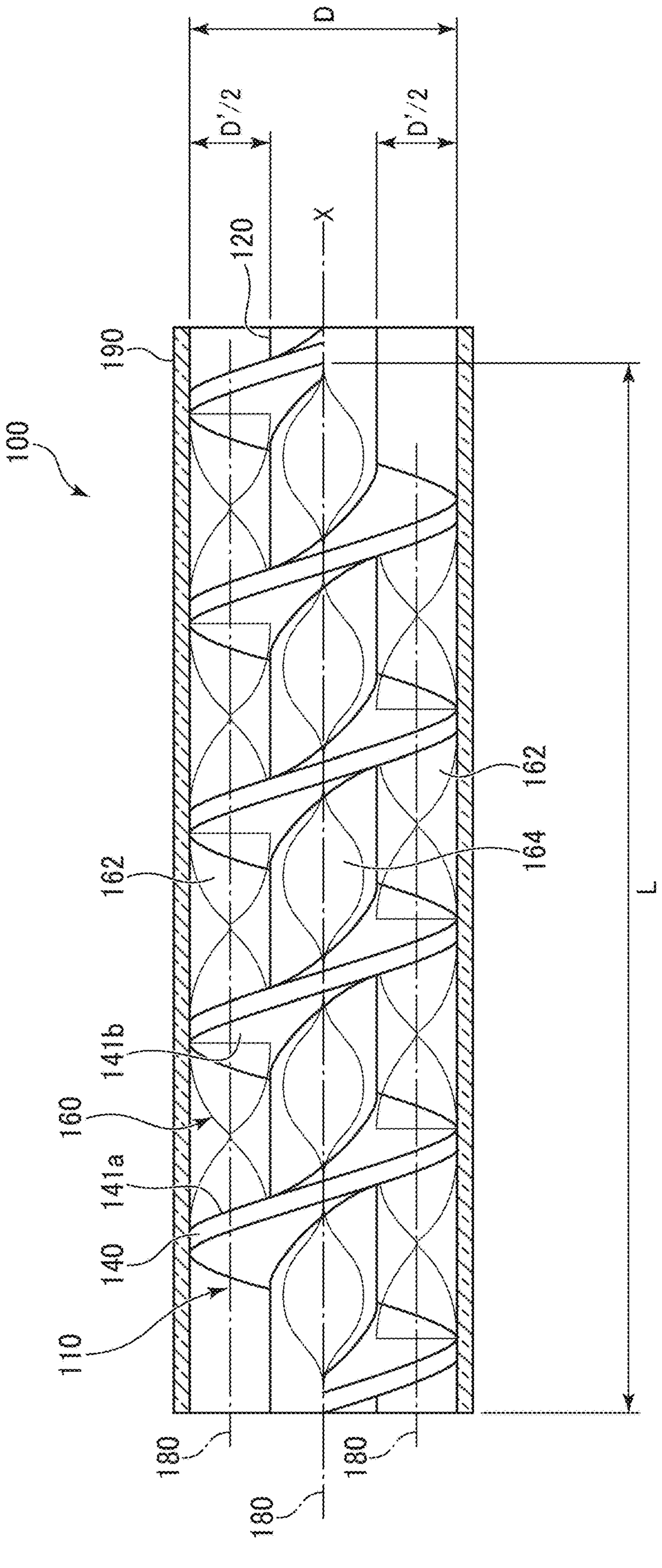
FIG. 1 is a schematic diagram of a first mixing apparatus according to a first embodiment of the present invention.

A first mixing apparatus 100 according to a first embodiment of the present invention will now be described with reference to FIG. 1.

The first mixing apparatus 100 mainly includes a first mixing blade 110 and a housing tube 190, and is made of resin and/or metal. Further, the first mixing blade 110 mainly includes a first shaft 120, a first blade 140, and a second blades 160.

The first shaft 120 is, for example, a cylinder having a diameter of about 16.5 mm and an axial length of about 150 mm. The first blade 140 is a spiral formed continuously around the first shaft 120. More specifically, the first blade 140 is formed by winding, for example, a strip-shaped flat plate, having a width of 12 mm, around the outer circumference of the first shaft 120 five times so as to draw a spiral clockwise toward the traveling direction of the fluid to be described below. In other words, the flat plate is attached to the outer circumference of the first shaft 120 so that the width direction thereof protrudes from the first shaft 120 in the radial direction of the first shaft 120. The winding start and winding end of the first blade 140 are at the same position in the circumference of the first shaft 120. Further, the pitch of the first blade 140 in the direction of the first shaft 120 is, for example, about 30 mm. In the first blade 140, a parts of the blade facing in the direction of the first shaft 120 are referred to as facing blade portions 141*a* and 141*b*.

The second blades 160 are formed so that they are twisted around a second axis 180 parallel to the first shaft (axis X) 120. More specifically, the second blades 160 each have a shape formed by twisting, for example, a strip-shaped flat plate, having a width of 12 mm, by 180 degrees, which is half a turn, around the axis extending in the longitudinal direction at the flat plate center in the width direction. The second blades 160 twisted clockwise toward the traveling direction of the fluid, to be described below, are referred to as a second right-turn blades 162. The second blades 160 twisted counterclockwise are referred to as a second left-turn blades 164. Hereinafter, the direction in which the blades are twisted is referred to as the blade twisting direction. When all the second blades 160 are twisted in the same direction, the twisting direction of the second blades 160 is referred to as the same directions. When the second blades 160 are twisted in different directions, clockwise and counterclockwise, the twisting direction of the second blades 160 is referred to as left-right directions. In the axial direction of the first shaft 120, the second right-turn blade 162 and the second left-turn blade 164 are provided between the facing blade portions 141*a* and 141*b*. In the radial direction of the first shaft 120, the second right-turn blade 162 and the second left-turn blade 164 are provided between the outer circumference of the first shaft 120 and the outer end of the first blade 140. In the state in which the first mixing blade 110 is inserted into the housing tube 190, the second right-turn blade 162 and the second left-turn blade 164 are not in contact with the housing tube 190. The second right-turn blade 162 and the second left-turn blade 164 have their ends whose width direction is in the radial direction of the first shaft 120, and are alternately formed in the circumferential direction of the first shaft 120. The second right-turn blades 162 and the second left-turn blades 164 are thus attached onto the facing blade portions 141*a* and 141*b*. In the present embodiment, 18 second right-turn blades 162 and 18 second left-turn blades 164 are provided, and totally 36 second blades 160 are provided. The manners of attaching the second blades 160 to the facing blade portions 141*a* and 141*b* include adhesive, welding, and/or solder. An interval between a second right-turn blade 162 and a second left-turn blade 164 in the circumferential direction of the first shaft 120, that is, around the first shaft 120, is one time or more and less than two times the diameter of the second right-turn blade 162 and the second left-turn blade 164. This interval in the present embodiment is, for example, 10 mm. The second blades 160 are provided along the entire length of the spiral of the first blade 140, that is, over the entire length of the first shaft 120. Here, the length of the portion, where the second blades 160 are provided in the longitudinal direction of the first shaft 120 (first axial direction), is referred to as a second blade length L, and the second blade length L=150 mm in the present embodiment.

The housing tube 190 has a cylindrical shape that has an axial length equal to or greater than the axial length of the first mixing blade 110, and that has an inner diameter causing a slight friction with the outer circumference of the first mixing blade 110. The housing tube 190 houses the first mixing blade 110 in the inner circumference thereof. The inner diameter D of the housing tube 190 is, for example, 40 mm, and the length is, for example, 150 mm. The inner circumference of the housing tube 190 is in close contact with the outer circumference of the first mixing blade 110 so that no fluid flows in between the outer circumference of the first blade 140 and the inner circumference of the housing tube 190. The ratio L/D of the second blade length L to the inner diameter D of the housing tube 190 is L/D=150/40=3.75. Further, because the effective inner diameter D' excluding the first shaft 120 is D'=40−16.5=23.5 mm, the effective ratio L/D'=150/23.5=6.38.

The use of the first mixing apparatus 100 will now be described. Two or more fluids are sent from an inflow end, which is one end of the first mixing apparatus 100. Two or more fluids flow between the first blade 140 and the housing tube 190, and at the same time, alternately collide with the second right-turn blade 162 and the second left-turn blade 164, to be sheared to be mixed with each other. Then, the fluids flows between the 36 second blades 160, are then sufficiently mixed, and flow out from an outflow end, which is the other end of the first mixing apparatus 100.

The fluid is preferably, for example, a two-component urethane paint, a three-component urethane paint, or a two-component or three-component waterproof material (hereinafter referred to as a paint, etc.), but is not limited thereto.

According to the present embodiment, a first mixing apparatus 100 capable of sufficiently mixing a plurality of fluids is obtained. For example, when a paint or the like is mixed by the first mixing apparatus 100, the fluid is mixed to such an extent that sufficient coating quality can be obtained.

Figure 2:
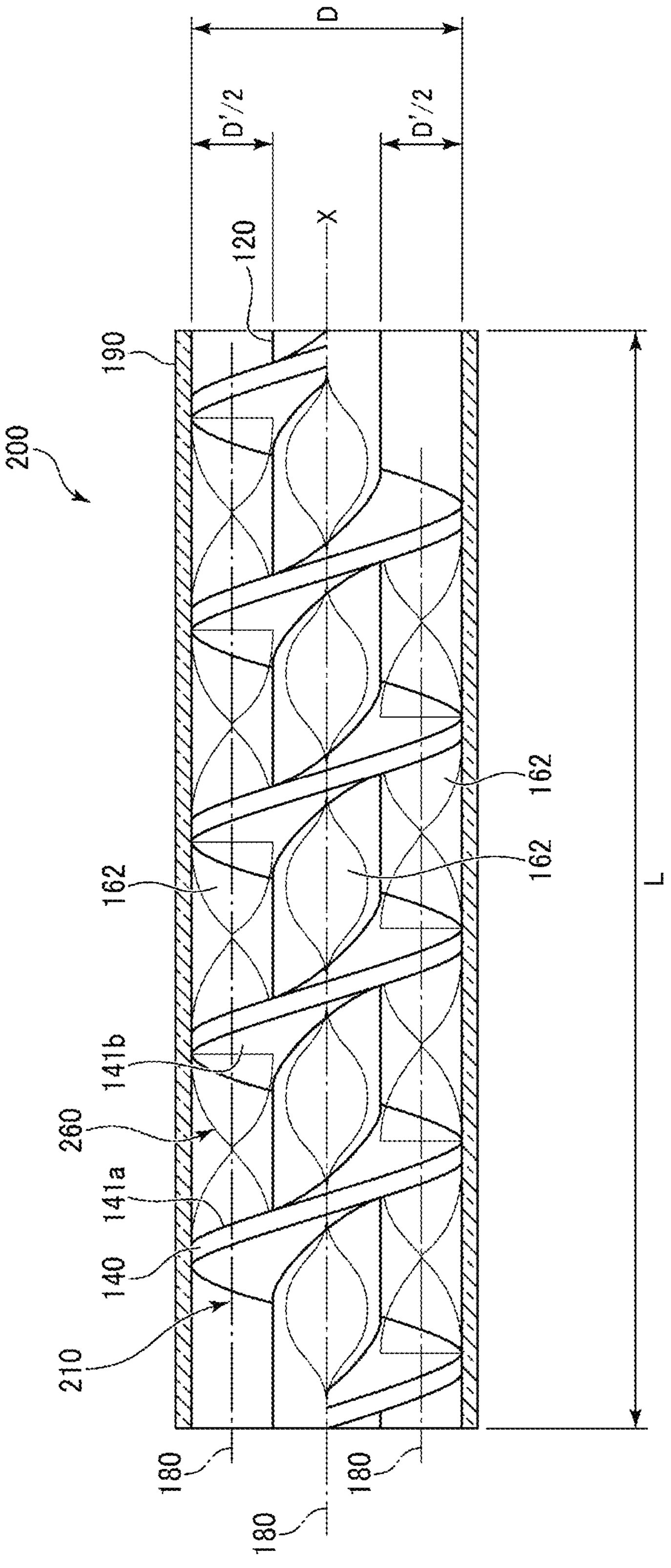
FIG. 2 is a schematic diagram of a second mixing apparatus according to a second embodiment.

The second mixing apparatus 200 according to the second embodiment will now be described with reference to FIG. 2. The same configurations as those of the first embodiment are designated by the same reference numerals, and the description thereof is to be omitted. Note that the housing tube 190 is omitted in FIG. 2.

The second mixing apparatus 200 mainly includes a second mixing blade 210 and a housing tube 190, and is made of resin and/or metal. Further, the second mixing blade 210 mainly includes a first shaft 120, a first blade 140, and second blades 260. The housing tube 190, the first shaft 120, and the first blade 140 are the same as those in the first embodiment, so the description thereof is to be omitted.

The second blade 260 according to the present embodiment includes only the second right-turn blades 162. The second right-turn blades 162 are provided between the facing blade portions 141*a* and 141*b* in the axial direction of the first shaft 120. In the radial direction of the first shaft 120, the second right-turn blades 162 are provided between the outer circumference of the first shaft 120 and the outer end of the first blade 140. In the state in which the first mixing blade 110 is inserted into the housing tube 190, the second blades 260 are not in contact with the housing tube 190. The second right-turn blades 162 have their ends whose width direction is in the radial direction of the first shaft 120, and are alternately formed in the circumferential direction of the first shaft 120. The second right-turn blades 162 are thus attached onto the facing blade portions 141*a* and 141*b*. In the present embodiment, 36 second right-turn blade 162 are provided. An interval between the adjacent second right-turn blades 162 in the circumferential direction of the first shaft 120, that is, around the first shaft 120, is one time or more and less than two times the diameter of the second right-turn blade 162. This interval in the present embodiment is, for example, 10 mm. The second blades 260 are provided along the entire length of the spiral of the first blade 140, that is, over the entire length of the first shaft 120. Similarly to the first embodiment, the ratio L/D of the second blade length L to the inner diameter D of the housing tube 190 is L/D=3.75, and the effective ratio L/D'=6.38.

The use of the second mixing apparatus 200 will now be described. Two or more fluids are sent from an inflow end, which is one end of the second mixing apparatus 200. The two or more fluids flow between the first blade 140 and the housing tube 190, and collide with the second right-turn blades 162, to be sheared to be mixed with each other. Then, the fluids flows between the 36 second right-turn blades 162, are then sufficiently mixed, and flow out from an outflow end, which is the other end of the second mixing apparatus 200.

The present embodiment obtains the same effect as that of the first embodiment.

Figure 3:
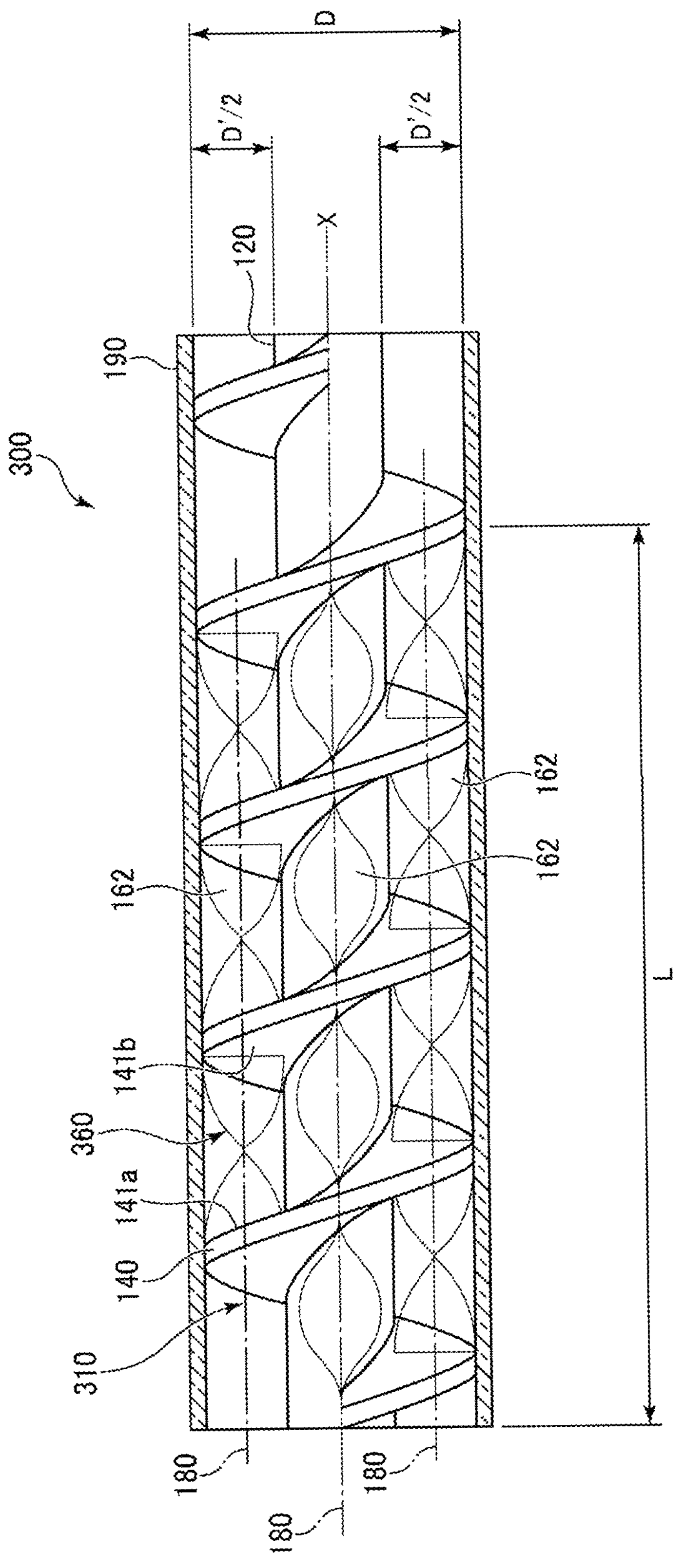
FIG. 3 is a schematic diagram of a third mixing apparatus according to a third embodiment.

A third mixing apparatus 300 according to a third embodiment will now be described with reference to FIG. 3. The same configurations as those of the first and second embodiments are designated by the same reference numerals, and the description thereof is to be omitted. Note that the housing tube 190 is omitted in FIG. 3.

The third mixing apparatus 300 mainly includes a third mixing blade 310 and a housing tube 190, and is made of resin and/or metal. Further, the third mixing blade 310 mainly includes a first shaft 120, a first blade 140, and second blades 360. The housing tube 190, the first shaft 120, and the first blade 140 are the same as those in the first embodiment, so the description thereof is to be omitted.

The second blades 360 according to the present embodiment include only the second right-turn blades 162. The second right-turn blades 162 is provided in the same manner as in the second embodiment. However, the present embodiment differs from the second embodiment in that 24 second right-turn blades 162 are provided. An interval between the adjacent second right-turn blades 162 in the circumferential direction of the first shaft 120, that is, around the first shaft 120, is one time or more and less than two times the diameter of the second right-turn blade 162. This interval in the present embodiment is, for example, 10 mm. The second right-turn blades 162 are not provided over the entire length of the spiral of the first blade 140, that is, the entire length of the first shaft 120. In other words, this creates a space, in which the second blade 360 is not provided, on the inflow end side. The length (second blade length) L of the portion where the second blades 360 are provided in the longitudinal direction of the first shaft 120 is the second blade length L=100 mm in the present embodiment. Therefore, the ratio L/D of the second blade length L to the inner diameter D of the housing tube 190 is L/D=100/40=2.50. Further, the effective ratio L/D'=100/23.5=4.26.

The use of the third mixing apparatus 300 will now be described. Two or more fluids are sent from one end of the third mixing apparatus 300. The two or more fluids flow between the first blade 140 and the housing tube 190, and collide with the second right-turn blades 162, to be sheared to be mixed with each other. Then, the fluids flows between the 24 second right-turn blades 162, are then sufficiently mixed, and flow out from the other end of the third mixing apparatus 300.

The present embodiment obtains the same effect as that of the first embodiment.

Note that, in the present embodiment, the length of the first blade 140 along the spiral is described to be the same as in the first embodiment, and this creates a space without the second blade 360 on the inflow end side. However, the configuration may be such that: the length of the second blade 360 provided along the spiral of the first blade 140 is equal to the spiral length of the first blade 140; a space without the second blade 360 is not provided on the inflow end side; and the axial length of the third mixing apparatus 300 is shorter than that of the first embodiment.

Figure 4:
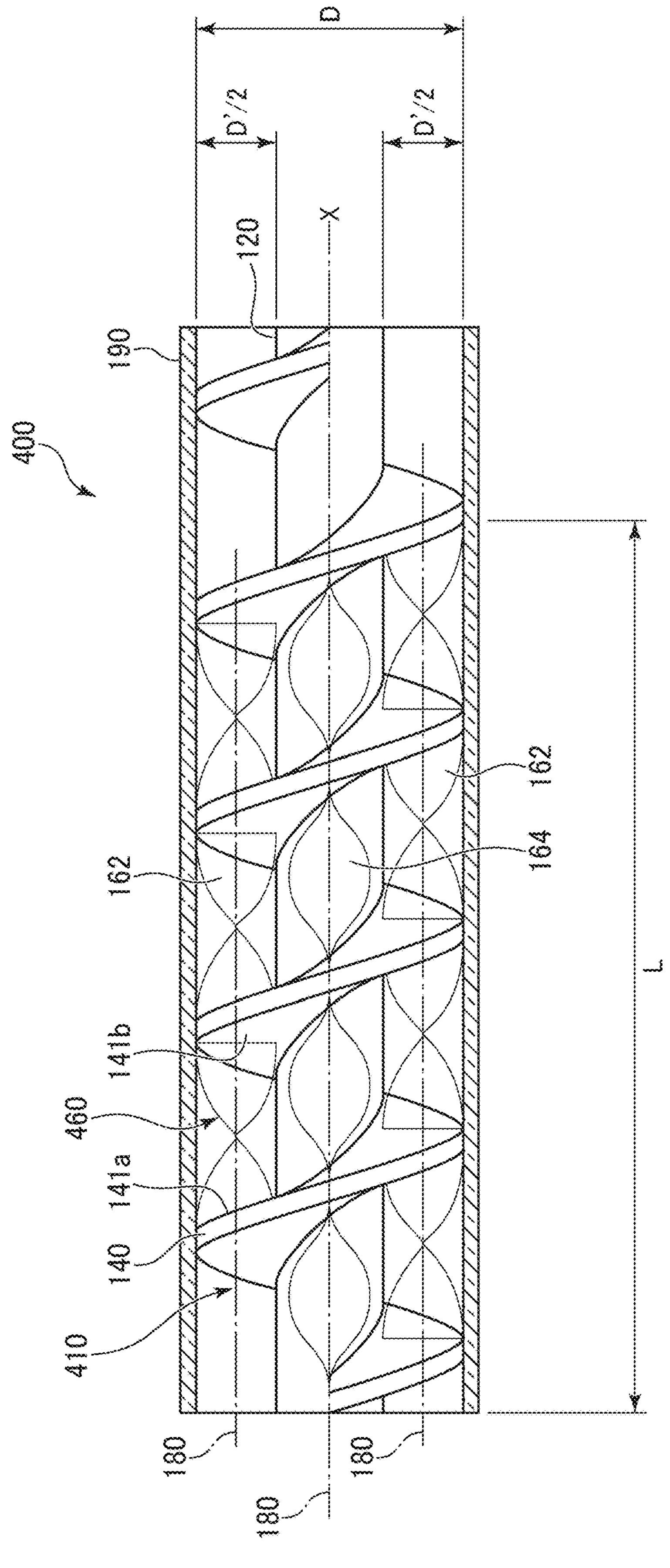
FIG. 4 is a schematic diagram of a fourth mixing apparatus according to a fourth embodiment.

A fourth mixing apparatus 400 according to a fourth embodiment will now be described with reference to FIG. 4. The same configurations as those of the first to third embodiments are designated by the same reference numerals, and the description thereof is to be omitted.

The fourth mixing apparatus 400 mainly includes a fourth mixing blade 410 and a housing tube 190, and is made of resin and/or metal. Further, the fourth mixing blade 410 mainly includes a first shaft 120, a first blade 140, and second blades 460. The housing tube 190, the first shaft 120, and the first blade 140 are the same as those in the first embodiment, so the description thereof is to be omitted.

The second blades 460 according to the present embodiment includes second right-turn blades 162 and second left-turn blades 164. The second right-turn blade 162 and the second left-turn blade 164 is provided in the same manner as in the first embodiment. The present embodiment differs from the first embodiment in that 12 second right-turn blades 162 and 12 second left-turn blades 164 are provided. The second right-turn blades 162 and the second left-turn blades 164 are alternately provided. An interval between a second right-turn blade 162 and a second left-turn blade 164 in the circumferential direction of the first shaft 120, that is, around the first shaft 120, is one time or more and less than two times the diameter of the second right-turn blade 162 and the second left-turn blade 164. This interval in the present embodiment is, for example, 10 mm. The second right-turn blades 162 and the second left-turn blades 164 are not provided over the entire length of the spiral of the first blade 140, that is, the entire length of the first shaft 120. In other words, this creates a space, in which the second blade 360 is not provided, on the inflow end side. In the present embodiment, the length (second blade length) L of the portion where the second blade 460 is provided in the longitudinal direction of the first shaft 120 is the second blade length L=100 mm. Therefore, the ratio L/D of the second blade length L to the inner diameter D of the housing tube 190 is L/D=100/40=2.50. Further, the effective ratio L/D'=100/23.5=4.26.

The use of the fourth mixing apparatus 400 will now be described. Two or more fluids are sent from one end of the fourth mixing apparatus 400. The two or more fluids flow between the first blade 140 and the housing tube 190, and collide with the second right-turn blades 162 and the second left-turn blades 164, to be sheared to be mixed with each other. Subsequently, the fluids flows between the 24 second blades 460, are then sufficiently mixed, and flow out from the other end of the fourth mixing apparatus 400.

The present embodiment obtains the same effect as that of the first embodiment.

Note that, in the present embodiment, the length of the first blade 140 along the spiral is described to be the same as in the first embodiment, and this creates a space without the second blade 460 on the inflow end side. However, the configuration may be such that: the length of the second blade 460 provided along the spiral of the first blade 140 is equal to the spiral length of the first blade 140; a space without the second blade 460 is not provided on the inflow end side; and the axial length of the fourth mixing apparatus 400 is shorter than that of the first embodiment. At this time, if the first blade 140 is wound around the first shaft 120 by at least 10/3 turns or more, 24 second blades 460 can be arranged.

Figure 5:
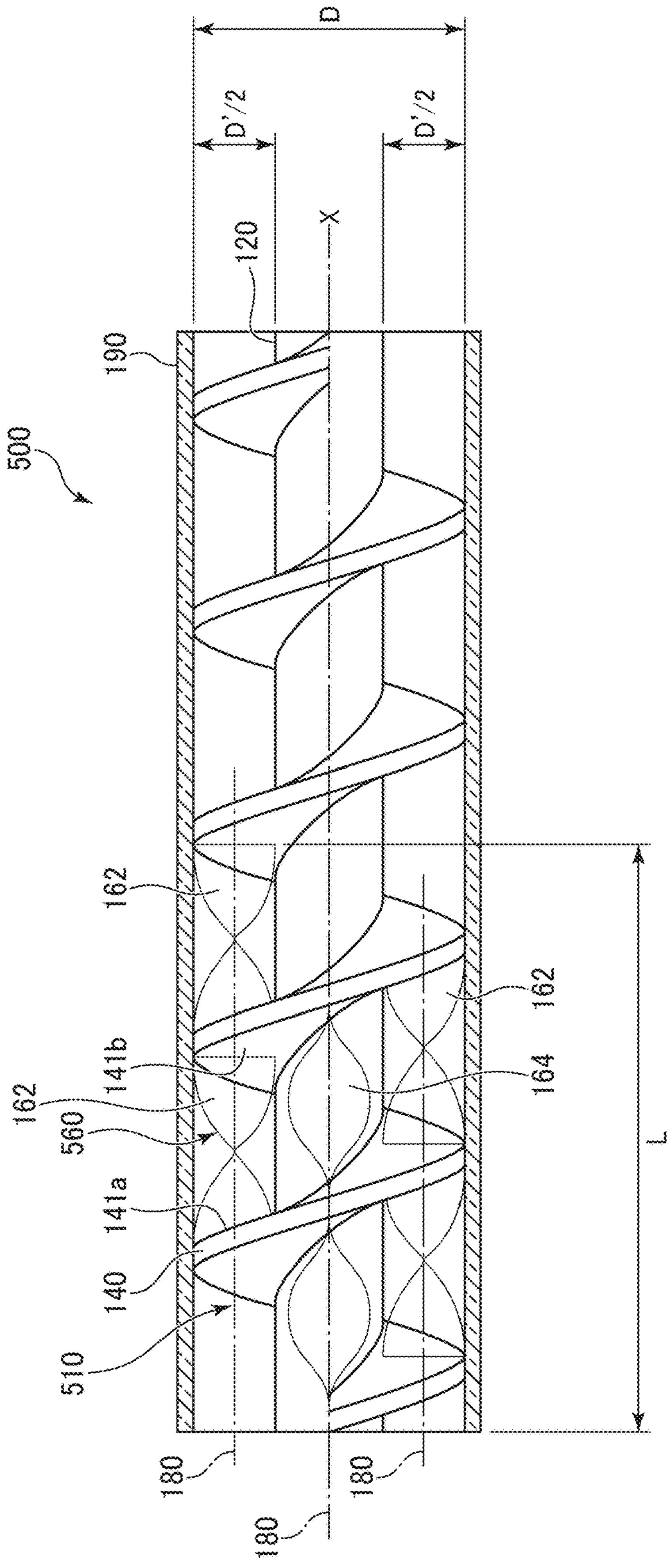
FIG. 5 is a schematic diagram of a fifth mixing apparatus according to a fifth embodiment.

A fifth mixing apparatus 500 according to the fifth embodiment will now be described with reference to FIG. 5. The same configurations as those of the first to fourth embodiments are designated by the same reference numerals, and the description thereof is to be omitted. Note that the housing tube 190 is omitted in FIG. 5.

The fifth mixing apparatus 500 mainly includes a fifth mixing blade 510 and a housing tube 190, and is made of resin and/or metal. Further, the fifth mixing blade 510 mainly includes a first shaft 120, a first blade 140, and second blades 560. The housing tube 190, the first shaft 120, and the first blade 140 are the same as those in the first embodiment, so the description thereof is to be omitted.

The second blades 560 according to the present embodiment includes second right-turn blades 162 and second left-turn blades 164. The second right-turn blade 162 and the second left-turn blade 164 is provided in the same manner as in the first embodiment. However, the present embodiment differs from the first embodiment in that six second right-turn blades 162 and six second left-turn blades 164 are provided. The second right-turn blades 162 and the second left-turn blades 164 are alternately provided. An interval between a second right-turn blade 162 and a second left-turn blade 164 in the circumferential direction of the first shaft 120, that is, around the first shaft 120, is one time or more and less than two times the diameter of the second right-turn blade 162 and the second left-turn blade 164. This interval in the present embodiment is, for example, 10 mm. The second right-turn blades 162 and the second left-turn blades 164 are not provided over the entire length of the spiral of the first blade 140, that is, the entire length of the first shaft 120. In other words, this creates a space, in which the second blade 360 is not provided, on the inflow end side. In the present embodiment, the length (second blade length) L of the portion where the second blade 560 is provided in the longitudinal direction of the first shaft 120 is the second blade length L=50 mm. Therefore, the ratio L/D of the second blade length L to the inner diameter D of the housing tube 190 is L/D=50/40=1.25. Further, the effective ratio L/D'=50/23.5=2.13.

The use of the fifth mixing apparatus 500 will now be described. Two or more fluids are sent from one end of the fifth mixing apparatus 500. The two or more fluids flow between the first blade 140 and the housing tube 190, and collide with the second right-turn blades 162 and the second left-turn blades 164, to be sheared to be mixed with each other. Subsequently, the fluids flows between the 12 second blades 560, are then sufficiently mixed, and flow out from the other end of the fifth mixing apparatus 500.

The present embodiment obtains the same effect as that of the first embodiment.

Note that, in the present embodiment, the length of the first blade 140 along the spiral is described to be the same as in the first embodiment, and this creates a space without the second blade 560 on the inflow end side. However, the configuration may be such that: the length of the second blade 560 provided along the spiral of the first blade 140 is equal to the spiral length of the first blade 140; a space without the second blade 560 is not provided on the inflow end side; and the axial length of the fifth mixing apparatus 500 is shorter than that of the first embodiment. At this time, if the first blade 140 is wound around the first shaft 120 by at least 5/3 turns or more, 12 second blades 560 can be arranged.

The effect of the invention of the present application will now be described with reference to Examples and Comparative Examples according to the invention of the present application. Note that Examples and Comparative Examples were all carried out in an environment in which the temperature was about 21 degrees and the humidity was about 64%.

[Example 1-1] The first mixing apparatus 100 was used. At the beginning, two liquids each having a viscosity of 50,000 cp were filled in the housing tube 190 with the opening at one end being closed while separated by one plane including the axis of the housing tube 190. Then, the housing tube 190 was erected upright with the closed opening being located at the bottom, and the first mixing blade 110 was inserted from the top opening, which was the other end, so that the spiral direction of the first blade 140 turned right.

[Example 1-2] The first mixing apparatus 100 was used. At the beginning, two liquids each having a viscosity of 35,000 cp were filled in the housing tube 190 with the opening at one end being closed while separated by one plane including the axis of the housing tube 190. Then, the housing tube 190 was erected upright with the closed opening being located at the bottom, and the first mixing blade 110 was inserted from the top opening, which was the other end, so that the spiral direction of the first blade 140 turned right.

[Example 2-1] The second mixing apparatus 200 was used. At the beginning, two liquids each having a viscosity of 50,000 cp were filled in the housing tube 190 with the opening at one end being closed while separated by one plane including the axis of the housing tube 190. Then, the housing tube 190 was erected upright with the closed opening being located at the bottom, and the second mixing blade 210 was inserted from the top opening, which was the other end, so that the spiral direction of the first blade 140 turned right.

[Example 2-2] The second mixing apparatus 200 was used. At the beginning, two liquids each having a viscosity of 35,000 cp were filled in the housing tube 190 with the opening at one end being closed while separated by one plane including the axis of the housing tube 190. Then, the housing tube 190 was erected upright with the closed opening being located at the bottom, and the second mixing blade 210 was inserted from the top opening, which was the other end, so that the spiral direction of the first blade 140 turned right.

[Example 3] The third mixing apparatus 300 was used. At the beginning, two liquids each having a viscosity of 35,000 cp were filled in the housing tube 190 with the opening at one end being closed while separated by one plane including the axis of the housing tube 190. Then, the housing tube 190 was erected upright with the closed opening being located at the bottom, and the third mixing blade 310 was inserted from the top opening, which was the other end, so that the spiral direction of the first blade 140 turned right.

[Example 4] The fourth mixing apparatus 400 was used. At the beginning, two liquids each having a viscosity of 8,000 cp were filled in the housing tube 190 with the opening at one end being closed while separated by one plane including the axis of the housing tube 190. Then, the housing tube 190 was erected upright with the closed opening being located at the bottom, and the fourth mixing blade 410 was inserted from the top opening, which was the other end, so that the spiral direction of the first blade 140 turned right.

[Example 5] The fifth mixing apparatus 500 was used. At the beginning, two liquids each having a viscosity of 8,000 cp were filled in the housing tube 190 with the opening at one end being closed while separated by one plane including the axis of the housing tube 190. Then, the housing tube 190 was erected upright with the closed opening being located at the bottom, and the fifth mixing blade 510 was inserted from the top opening, which was the other end, so that the spiral direction of the first blade 140 turned right.

[Comparative Example 3-1] In the third mixing apparatus 300, the 24 second right-turn blades 162 were replaced with 12 second right-turn blades 162 and 12 second left-turn blades 164. In this mixing apparatus, two liquids each having a viscosity of 35,000 cp were filled in the housing tube 190 with the opening at one end being closed while separated by one plane including the axis of the housing tube 190. Then, the housing tube 190 was erected upright with the closed opening being located at the bottom, and the mixing blade was inserted from the top opening, which was the other end, so that the spiral direction of the first blade 140 turned right.

[Comparative Example 3-2] In the third mixing apparatus 300, the 24 second right-turn blades 162 were replaced with 12 second right-turn blades 162 and 12 second left-turn blades 164 alternately provided, and intervals between the 12 second right-turn blades 162 and the 12 second left-turn blades 164 were made 20 mm. In this mixing apparatus, two liquids each having a viscosity of 35,000 cp were filled in the housing tube 190 with the opening at one end being closed while separated by one plane including the axis of the housing tube 190. Then, the housing tube 190 was erected upright with the closed opening being located at the bottom, and the mixing blade was inserted from the top opening, which was the other end, so that the spiral direction of the first blade 140 turned right.

[Comparative Example 5] The fifth mixing apparatus 500 was used. At the beginning, two liquids each having a viscosity of 35,000 cp were filled in the housing tube 190 with the opening at one end being closed while separated by one plane including the axis of the housing tube 190. Then, the housing tube 190 was erected upright with the closed opening being located at the bottom, and the fifth mixing blade 510 was inserted from the top opening, which was the other end, so that the spiral direction of the first blade 140 turned right.

Evaluation

The following describes the results of the above experiments. Table 1 shows the experimental results.

TABLE 1

| | NUMBER OF BLADES | BLADE TWISTING DIRECTION | INTERVAL OF BLADES | FLUID VISCOSITY | RESULT |
|---|---|---|---|---|---|
| EXAMPLE 1-1 | 36 | LEFT-RIGHT DIRECTION | 1 cm | 50,000 cp | GOOD |
| EXAMPLE 1-2 | 36 | LEFT-RIGHT DIRECTION | 1 cm | 35,000 cp | GOOD |
| EXAMPLE 2-1 | 36 | SAME DIRECTION | 1 cm | 50,000 cp | GOOD |
| EXAMPLE 2-2 | 36 | SAME DIRECTION | 1 cm | 35,000 cp | GOOD |
| EXAMPLE 3 | 24 | SAME DIRECTION | 1 cm | 35,000 cp | GOOD |
| COMPARATIVE EXAMPLE 3-1 | 24 | LEFT-RIGHT DIRECTION | 1 cm | 35,000 cp | POOR |
| COMPARATIVE EXAMPLE 3-2 | 24 | LEFT-RIGHT DIRECTION | 2 cm | 35,000 cp | POOR |
| EXAMPLE 4 | 24 | LEFT-RIGHT DIRECTION | 1 cm | 8,000 cp | GOOD |
| EXAMPLE 5 | 12 | LEFT-RIGHT DIRECTION | 1 cm | 8,000 cp | GOOD |
| COMPARATIVE EXAMPLE 5 | 12 | LEFT-RIGHT DIRECTION | 1 cm | 35,000 cp | POOR |

Figure 6:
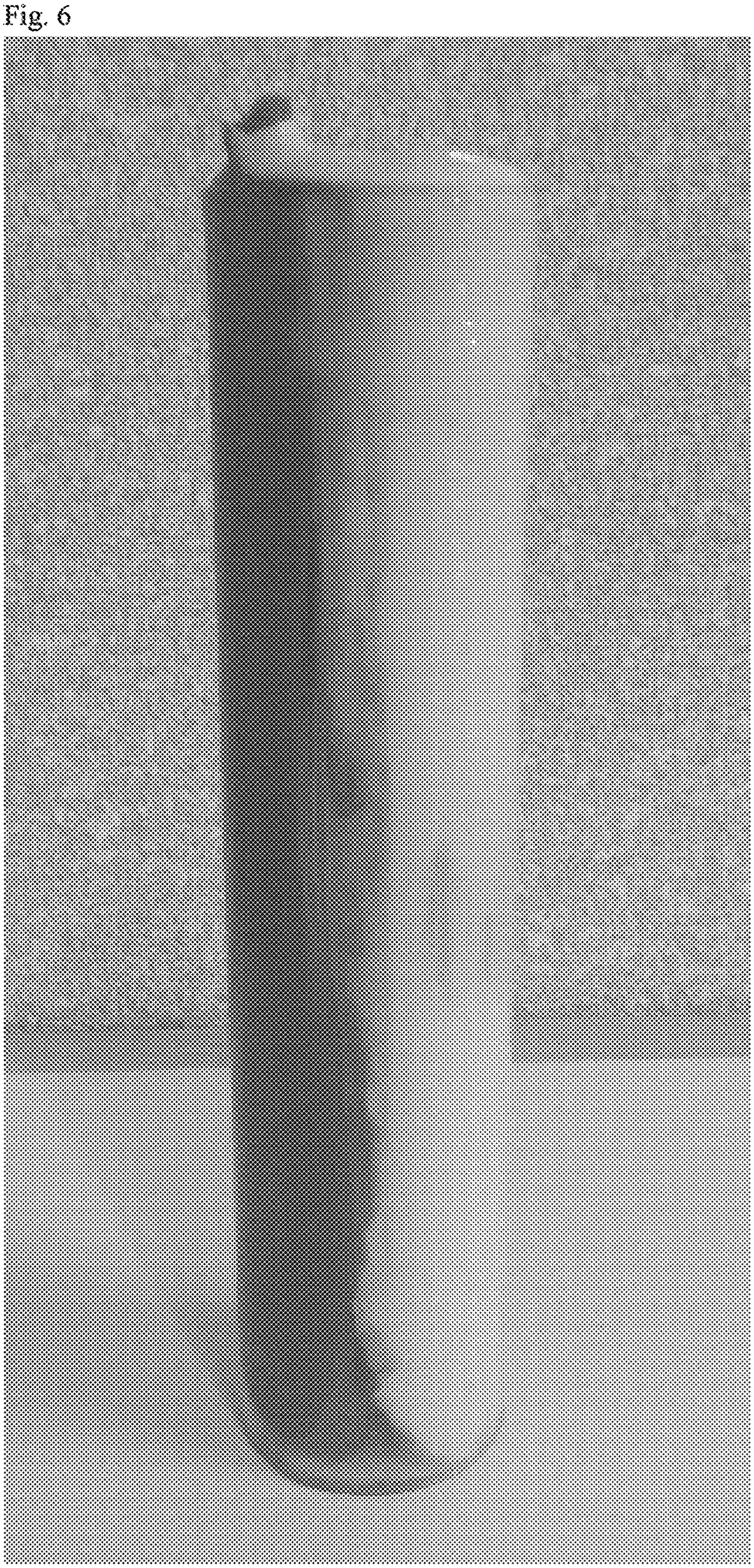
FIG. 6 is a photograph showing a mixed state according to Example 1-1 according to the first mixing apparatus.
Figure 7:
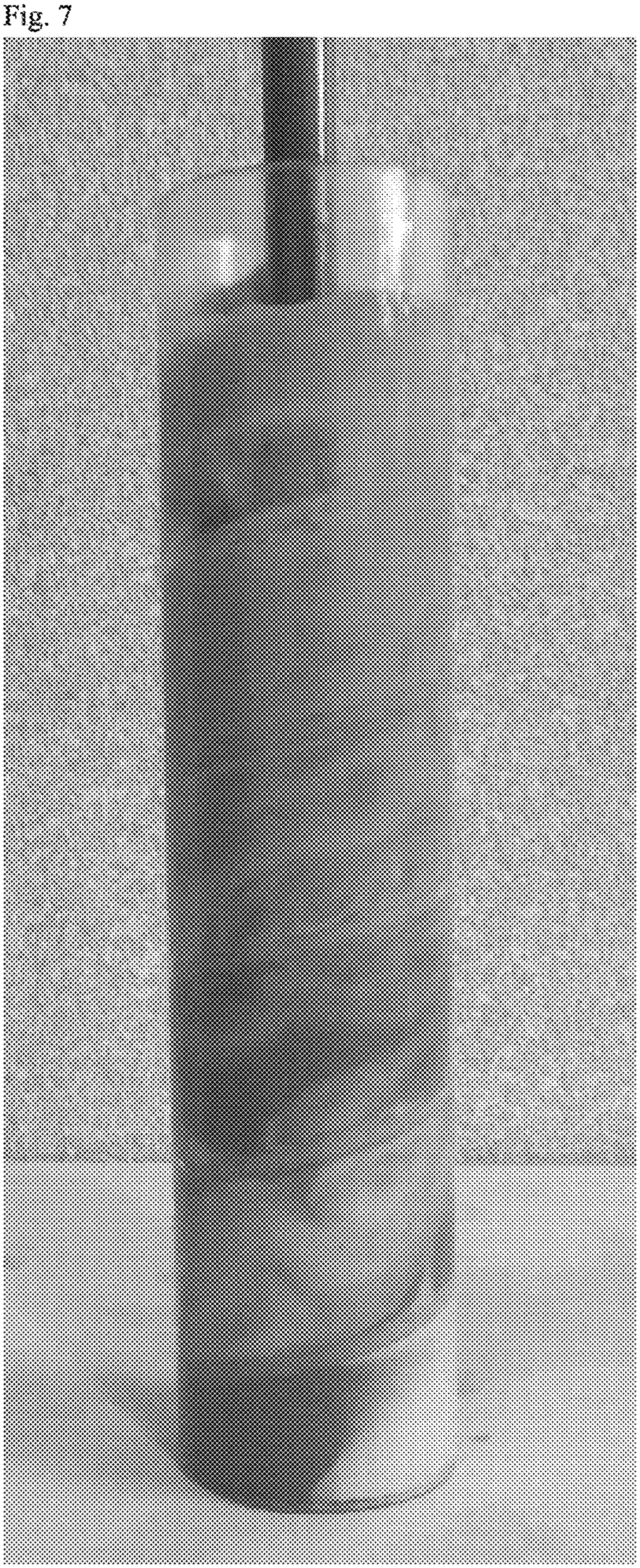
FIG. 7 is a photograph showing a mixed state according to Example 1-1 according to the first mixing apparatus.

[Example 1-1] FIGS. 6 and 7 show the experimental situation of Example 1-1. FIG. 6 shows a state in which the housing tube 190 is filled with two liquids having a viscosity of 50,000 cp. The two fluids are colored differently to make the mixed state visible. FIG. 7 shows a state in which the entire first mixing blade 110 is inserted into the housing tube 190. The two liquids inside the housing tube 190 are found to be completely mixed at the top.

Figure 8:
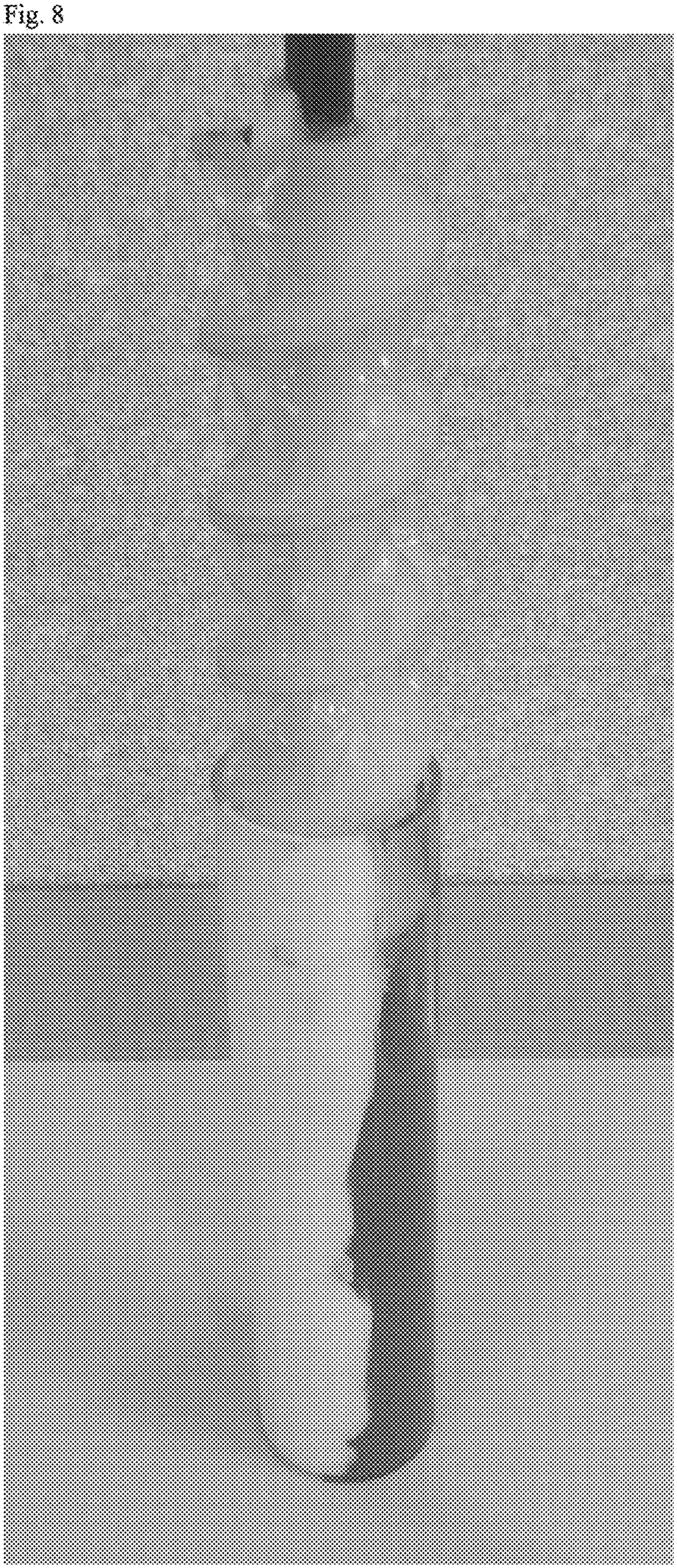
FIG. 8 is a photograph showing a mixed state according to Example 1-2 according to the first mixing apparatus.
Figure 9:
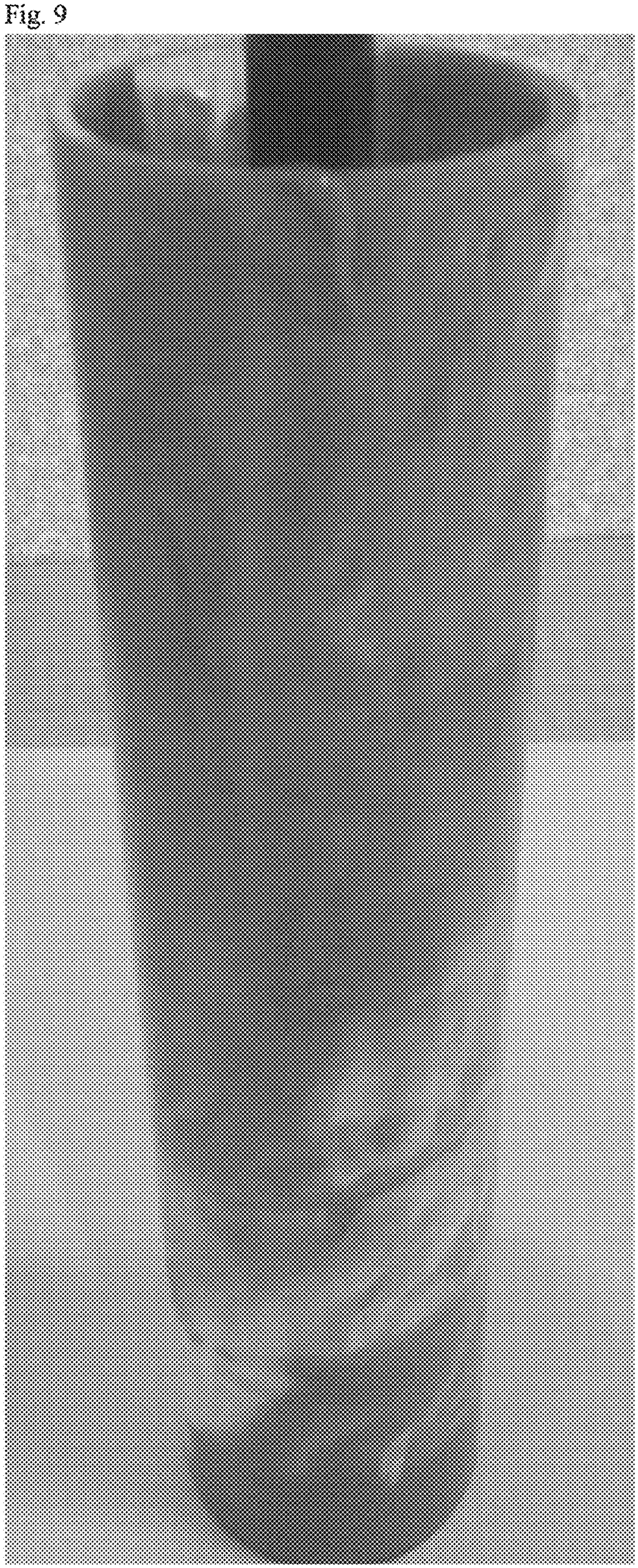
FIG. 9 is a photograph showing a mixed state according to Example 1-2 according to the first mixing apparatus.

[Example 1-2] FIGS. 8 and 9 show the experimental situation of Example 1-2. FIG. 8 shows a state in which the housing tube 190 is filled with two liquids having a viscosity of 35,000 cp. The two fluids are colored differently to make the mixed state visible. FIG. 9 shows a state in which the entire first mixing blade 110 is inserted into the housing tube 190. The two liquids inside the housing tube 190 are found to be completely mixed at the top.

Figure 10:
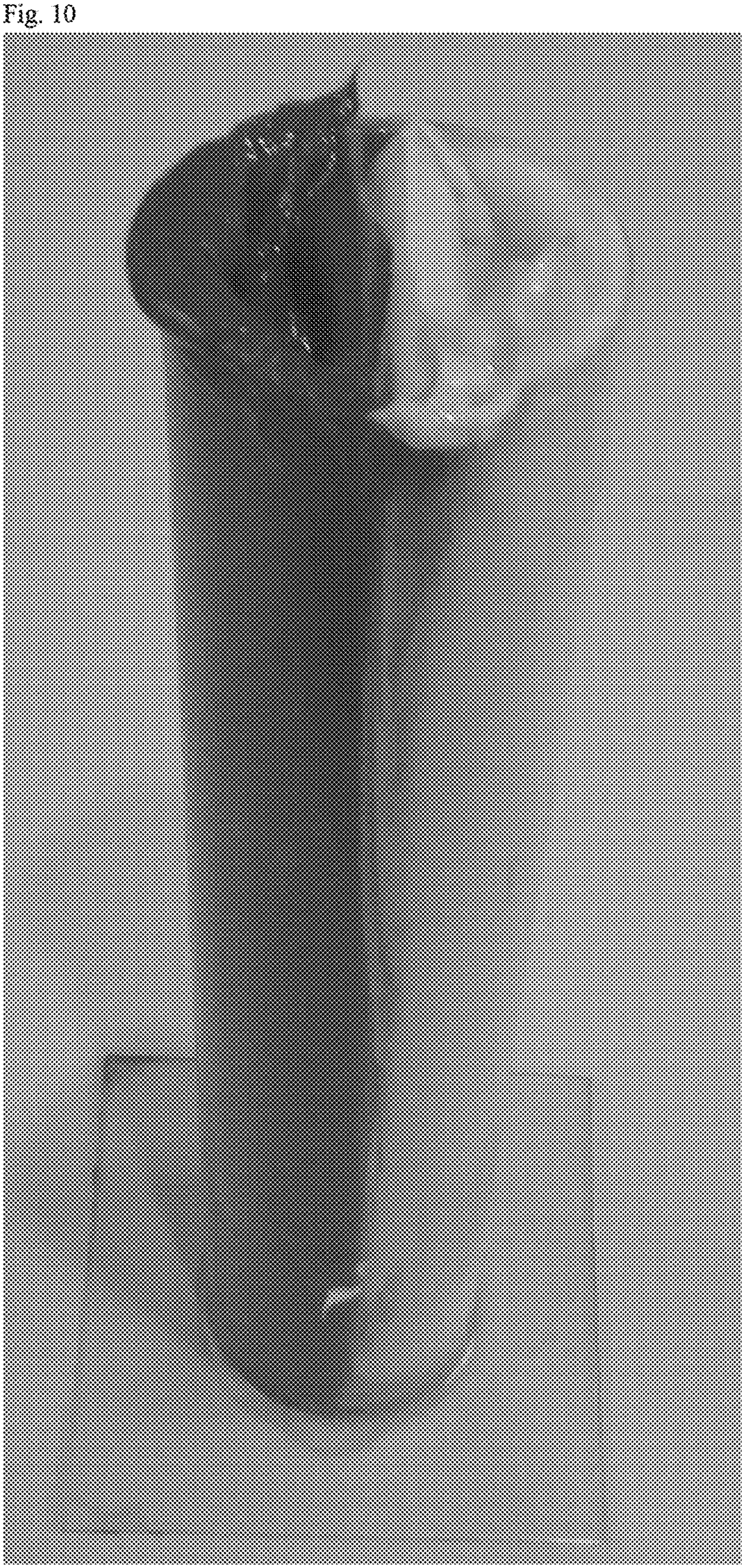
FIG. 10 is a photograph showing a mixed state according to Example 2-1 according to the second mixing apparatus.
Figure 11:
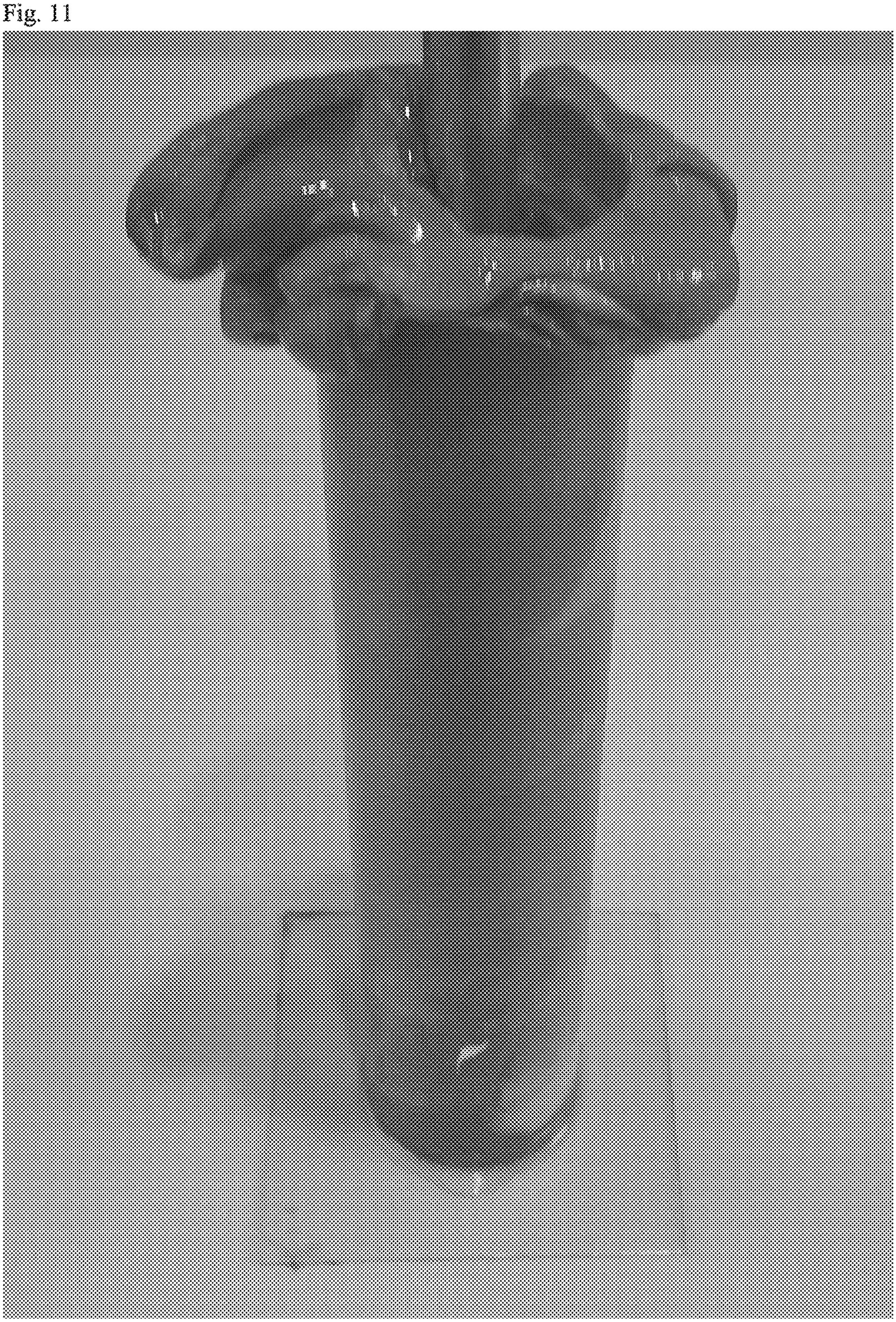
FIG. 11 is a photograph showing a mixed state according to Example 2-1 according to the second mixing apparatus.

[Example 2-1] FIGS. 10 and 11 show the experimental situation of Example 2-1. FIG. 10 shows a state in which the housing tube 190 is filled with two liquids having a viscosity of 50,000 cp. The two fluids are colored differently to make the mixed state visible. FIG. 11 shows a state in which the entire second mixing blade 210 is inserted into the housing tube 190. The two liquids inside the housing tube 190 are found to be completely mixed at the top.

Figure 12:
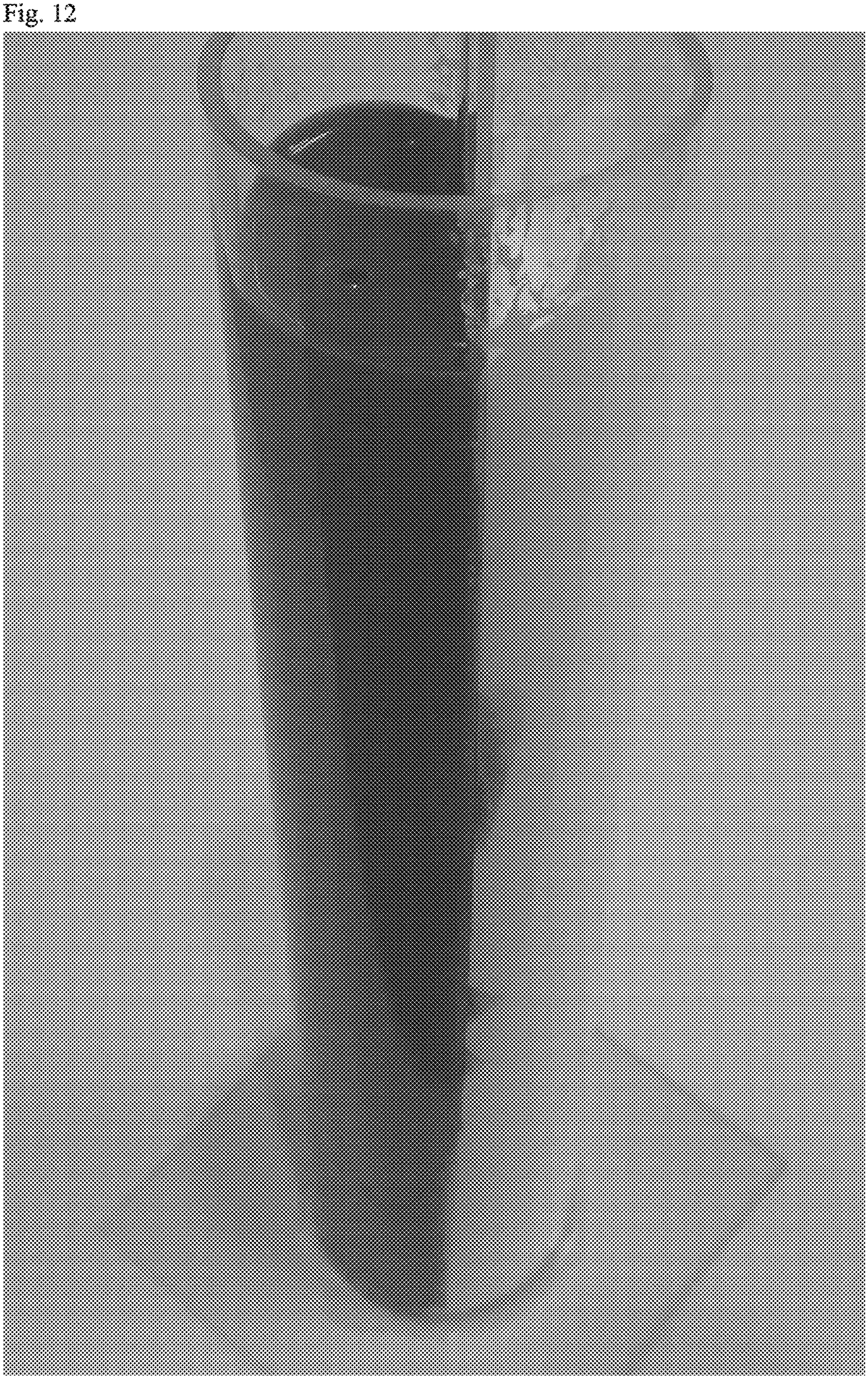
FIG. 12 is a photograph showing a mixed state according to Example 2-2 according to the second mixing apparatus.
Figure 13:
FIG. 13 is a photograph showing a mixed state according to Example 2-2 according to the second mixing apparatus.

[Example 2-2] FIGS. 12 and 13 shows the experimental situation of Example 2-2. FIG. 12 shows a state in which the housing tube 190 is filled with two liquids having a viscosity of 35,000 cp. The two fluids are colored differently to make the mixed state visible. FIG. 13 shows a state in which the entire second mixing blade 210 is inserted into the housing tube 190. The two liquids inside the housing tube 190 are found to be completely mixed at the top.

As described above, Examples 1-1, 1-2, 2-1 and 2-2 show that, when the number of the second blades 160 and 260 is 36 in total, the blade twisting direction is the same direction, and the intervals of the blades are 1 cm, the two fluids having a viscosity of 50,000 or less are sufficiently mixed.

Figure 14:
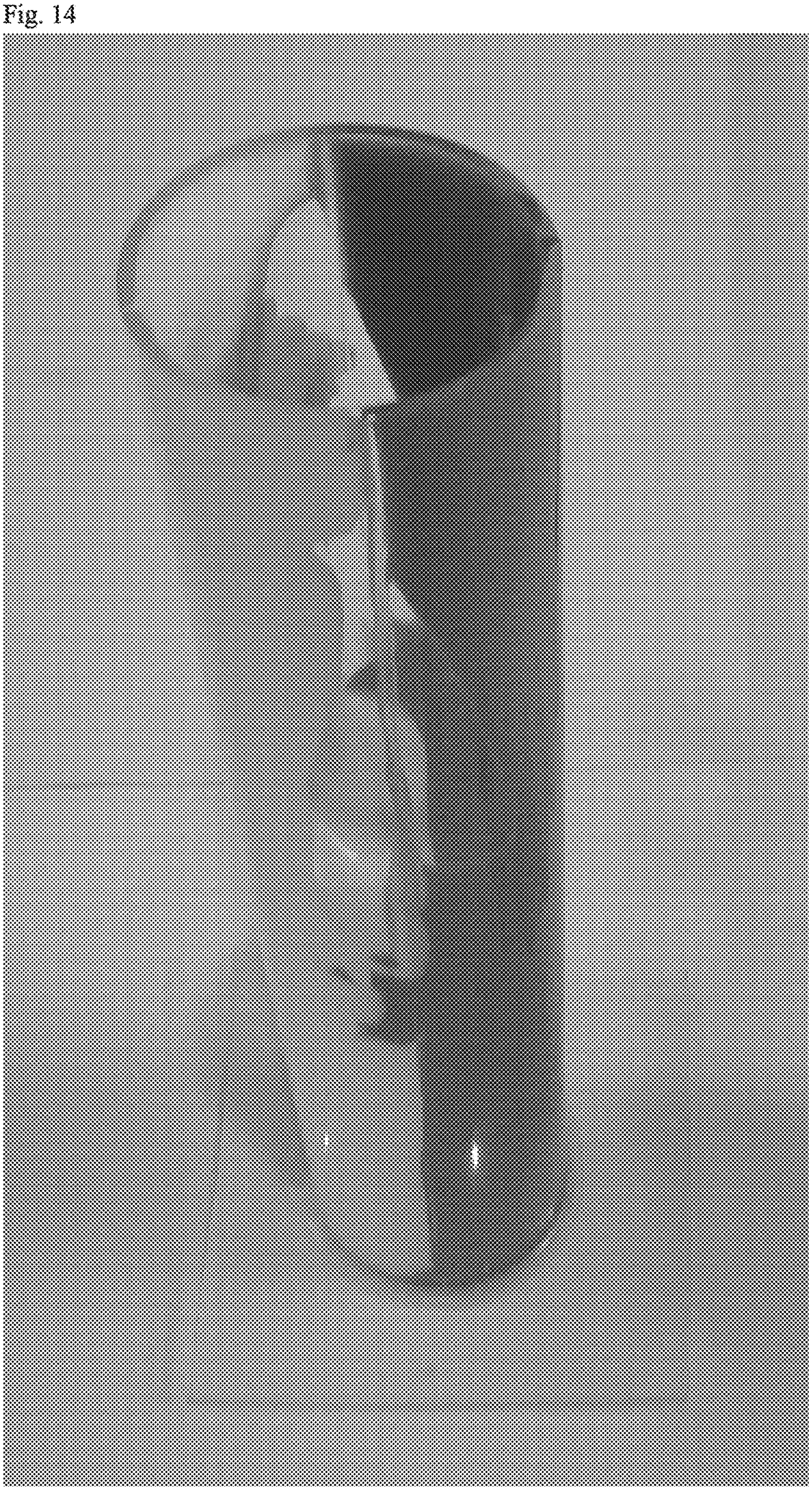
FIG. 14 is a photograph showing a mixed state according to Example 3 according to the third mixing apparatus.
Figure 15:
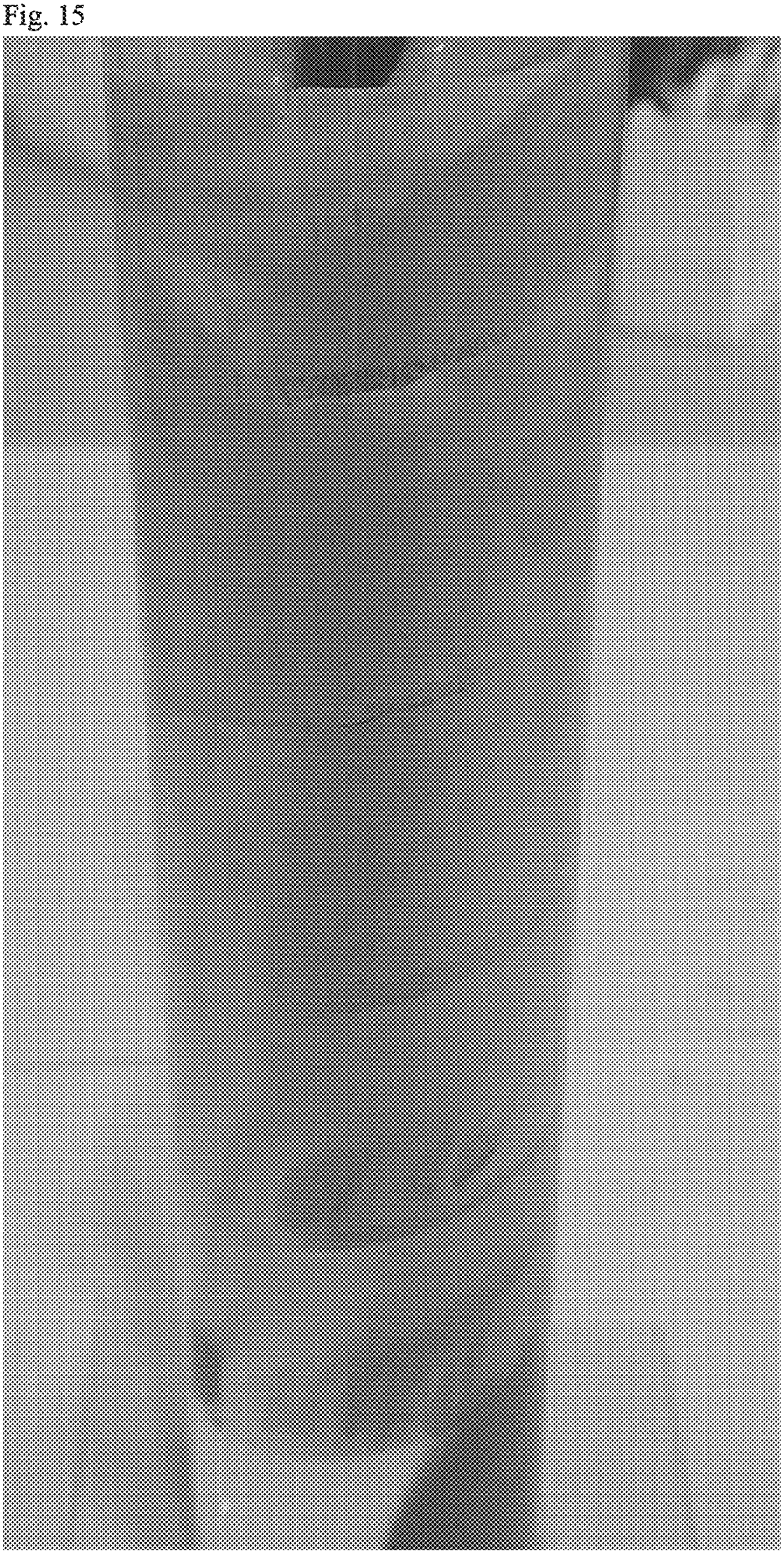
FIG. 15 is a photograph showing a mixed state according to Example 3 according to the third mixing apparatus.

[Example 3] FIGS. 14 and 15 show the experimental situation of Example 3. FIG. 14 shows a state in which the housing tube 190 is filled with two liquids having a viscosity of 35,000 cp. The two fluids are colored differently to make the mixed state visible. FIG. 15 shows a state in which the entire third mixing blade 310 is inserted into the housing tube 190. The two liquids inside the housing tube 190 are found to be completely mixed at the top.

Figure 16:
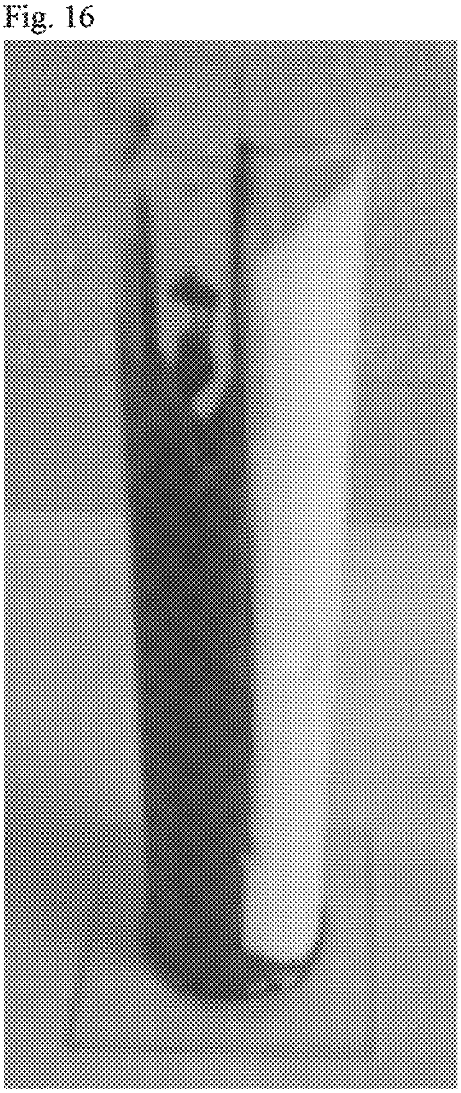
FIG. 16 is a photograph showing a mixed state according to Comparative Example 3-1.
Figure 17:
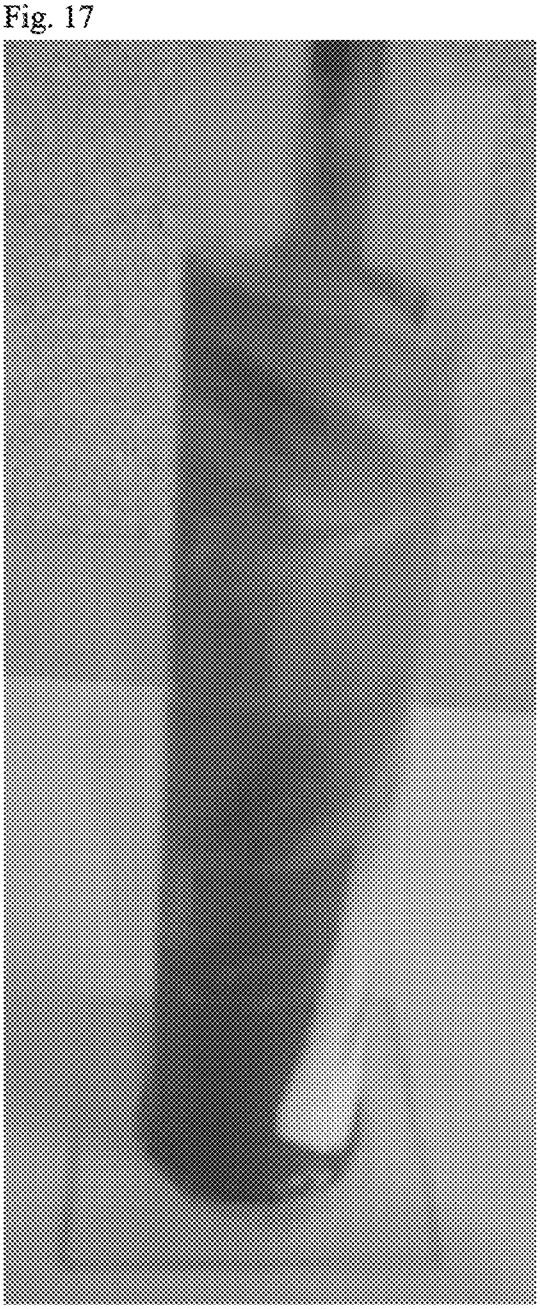
FIG. 17 is a photograph showing a mixed state according to Comparative Example 3-1.

[Comparative Example 3-1] FIGS. 16 and 17 show the experimental situation of Comparative Example 3-1. FIG. 16 shows a state in which the housing tube 190 is filled with two liquids having a viscosity of 35,000 cp. The two fluids are colored differently to make the mixed state visible. FIG. 17 shows a state in which the entire length of the mixing blade, which is provided with 12 second right-turn blades 162 and 12 second left-turn blades 164 at 1 cm intervals, is inserted into the housing tube 190. The two liquids inside the housing tube 190 are found to be in a state in which they do not completely mix at the top.

Figure 18:
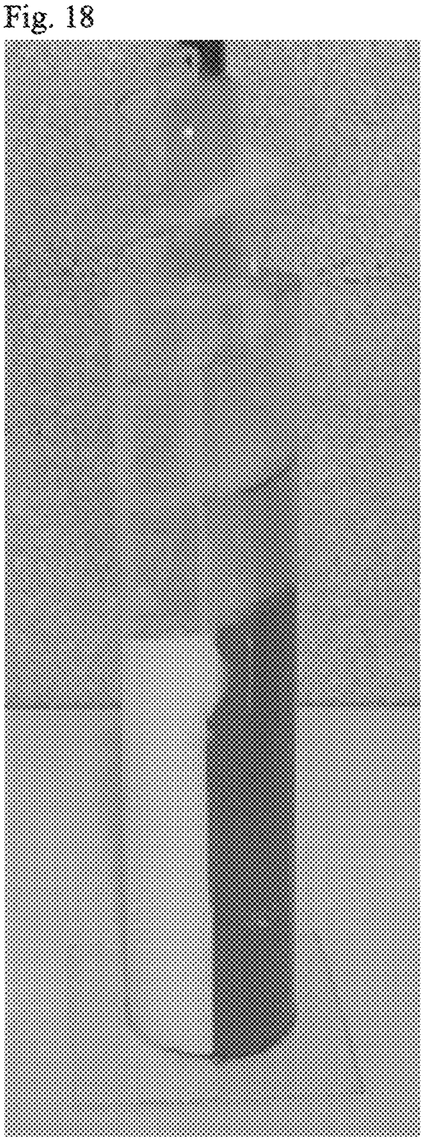
FIG. 18 is a photograph showing a mixed state according to Comparative Example 3-2.
Figure 19:
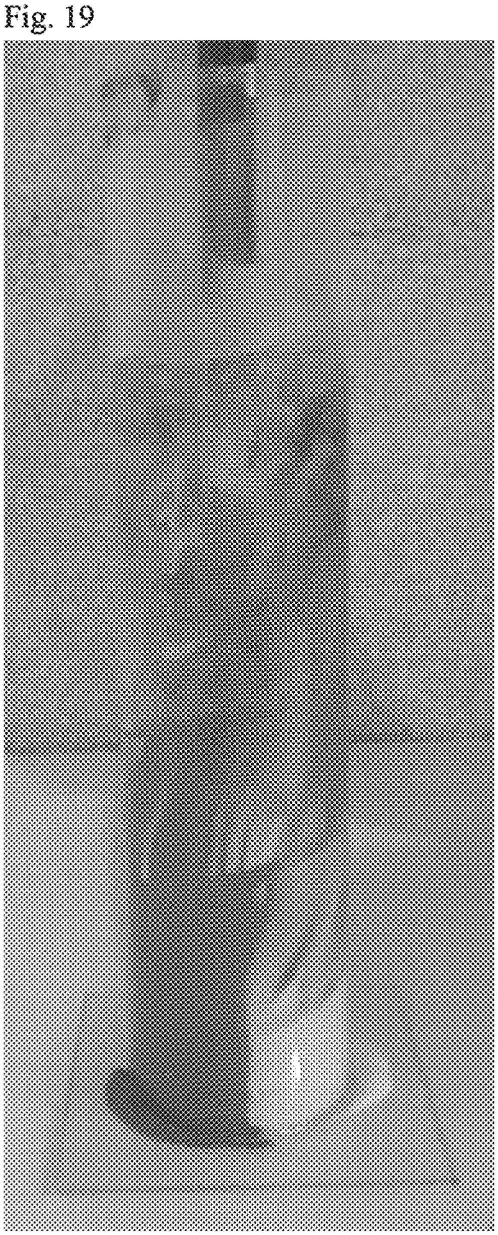
FIG. 19 is a photograph showing a mixed state according to Comparative Example 3-2.

[Comparative Example 3-2] FIGS. 18 and 19 shows the experimental situation of Comparative Example 3-2. FIG. 18 shows a state in which the housing tube 190 is filled with two liquids having a viscosity of 35,000 cp. The two fluids are colored differently to make the mixed state visible. FIG. 19 shows a state in which the entire length of the mixing blade, which is provided with 12 second right-turn blades 162 and 12 second left-turn blades 164 at 2 cm intervals, is inserted into the housing tube 190. The two liquids inside the housing tube 190 are found to be in a state in which they do not completely mix at the top.

Figure 20:
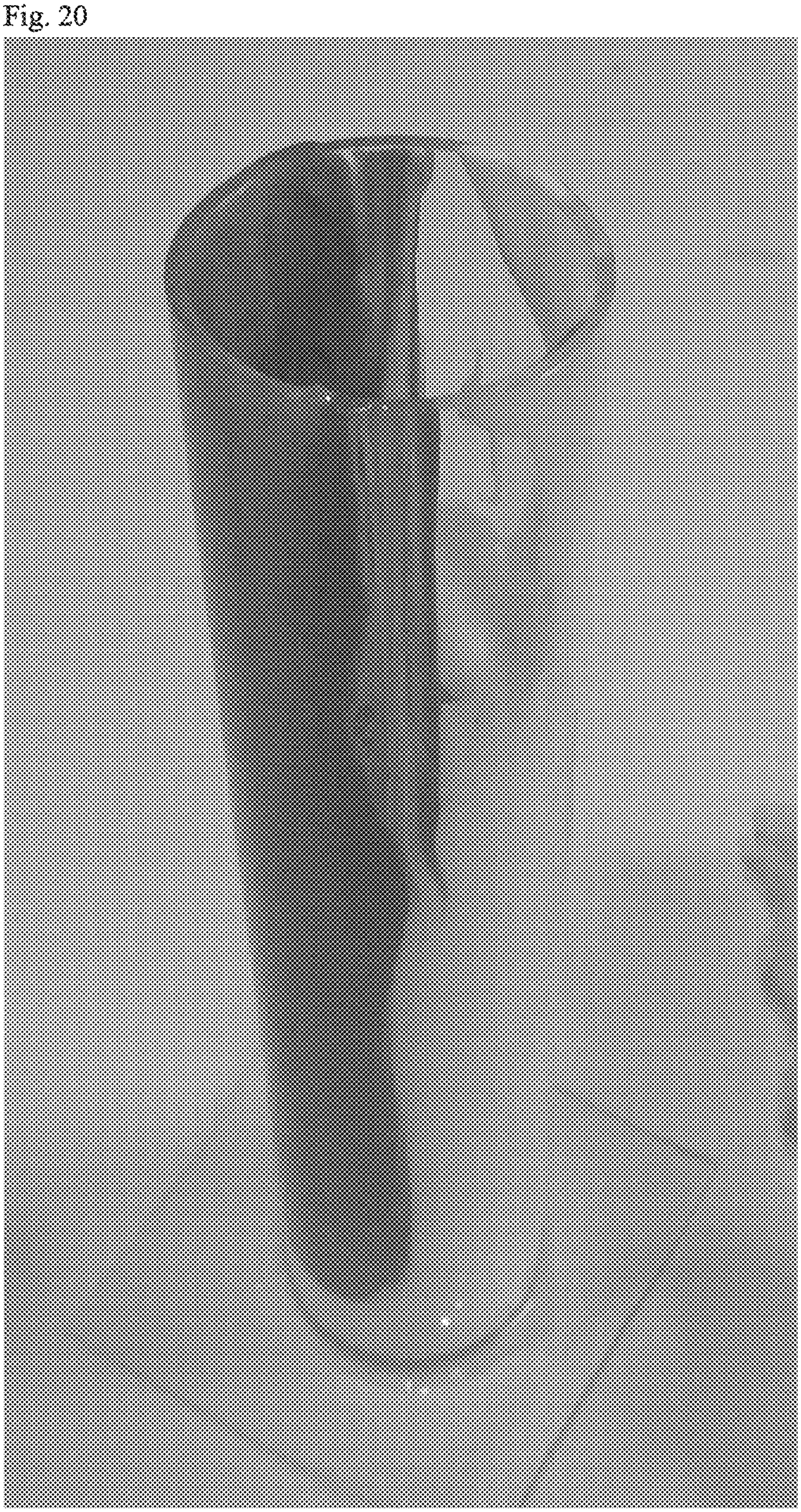
FIG. 20 is a photograph showing a mixed state according to Example 4 according to the fourth mixing apparatus.
Figure 21:
FIG. 21 is a photograph showing a mixed state according to Example 4 according to the fourth mixing apparatus.

[Example 4] FIGS. 20 and 21 show the experimental situation of Example 4. FIG. 20 shows a state in which the housing tube 190 is filled with two liquids having a viscosity of 8,000 cp. The two fluids are colored differently to make the mixed state visible. FIG. 21 shows a state in which the entire fourth mixing blade 410 is inserted into the housing tube 190. The two liquids inside the housing tube 190 are found to be completely mixed at the top.

As described above, Examples 3 and 4, and Comparative Examples 3-1 and 3-2 show that: when the number of second blades 360 is 24 in total, the blade twisting direction is the same direction, and the intervals of the blades are 1 cm, two fluids with a viscosity of 35,000 cp or less are sufficiently mixed; but when the blade twisting direction is left-right direction, the two fluids having a viscosity of 35,000 cp are not completely mixed but, when the viscosity is 8,000 cp, they are completely mixed. It was also found that, when the intervals of the blades are 2 cm, the two fluids having a viscosity of 35,000 are not completely mixed.

Figure 22:
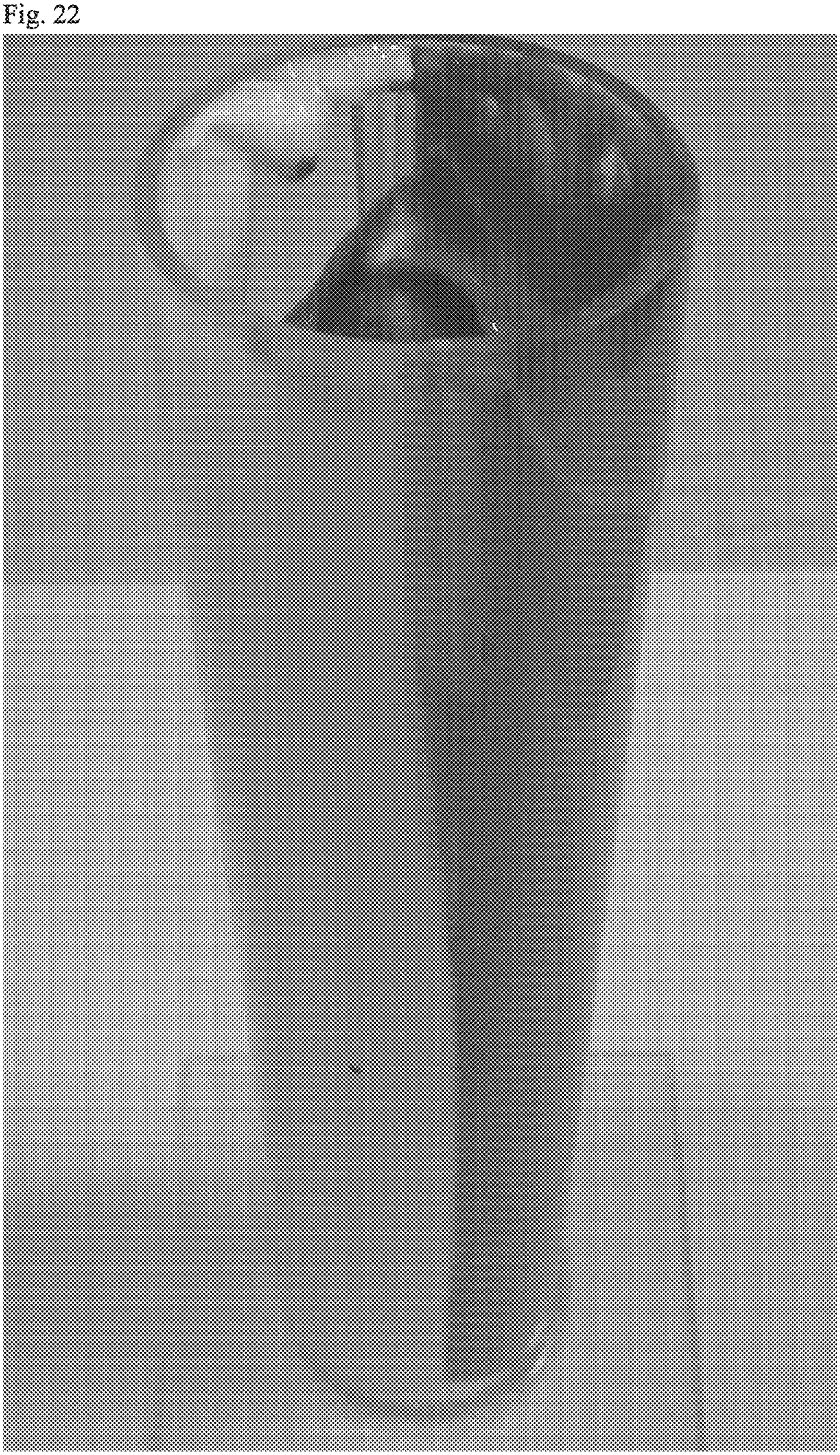
FIG. 22 is a photograph showing a mixed state according to Example 5 according to the fifth mixing apparatus.
Figure 23:
FIG. 23 is a photograph showing a mixed state according to Example 5 according to the fifth mixing apparatus.

[Example 5] FIGS. 22 and 23 show the experimental situation of Example 5. FIG. 22 shows a state in which the housing tube 190 is filled with two liquids having a viscosity of 8,000 cp. The two fluids are colored differently to make the mixed state visible. FIG. 23 shows a state in which the entire fifth mixing blade 510 is inserted into the housing tube 190. The two liquids inside the housing tube 190 are found to be completely mixed at the top.

Figure 24:
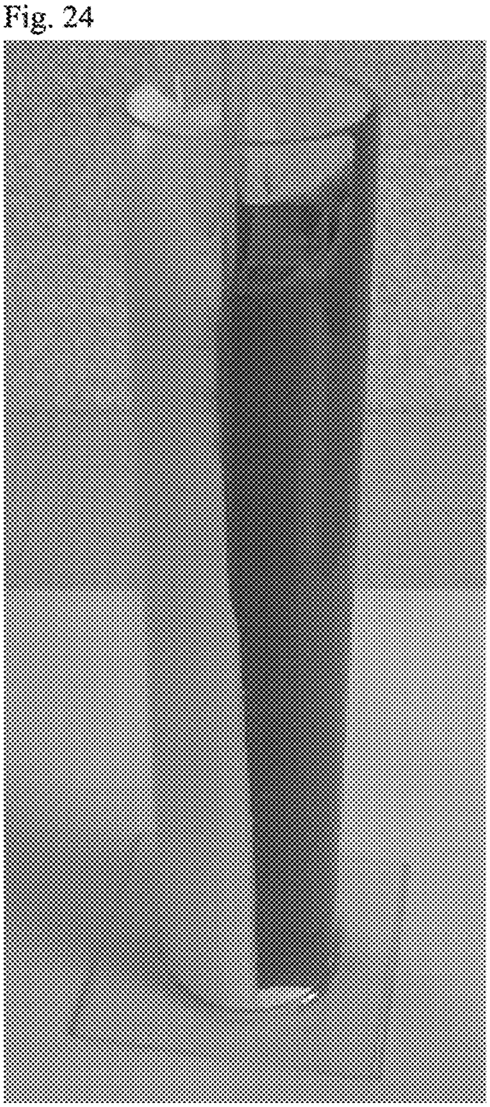
FIG. 24 is a photograph showing a mixed state according to Comparative Example 5.
Figure 25:
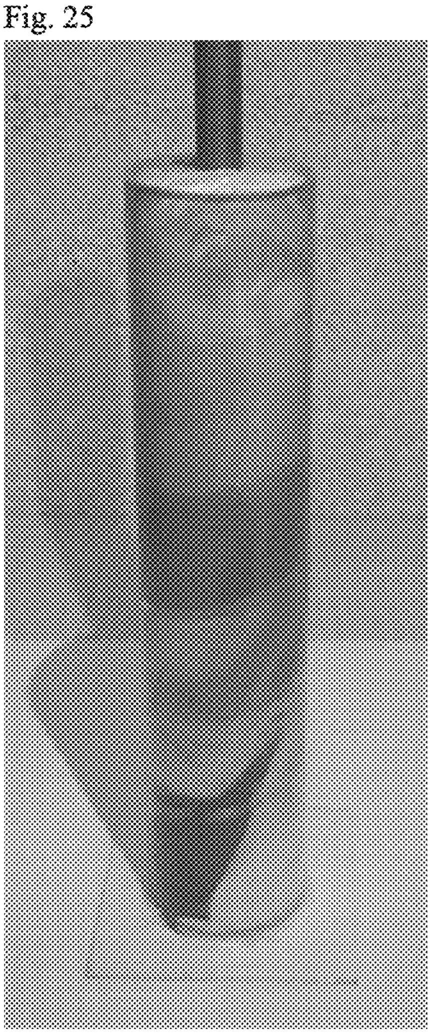
FIG. 25 is a photograph showing a mixed state according to Comparative Example 5.
Figure 26:
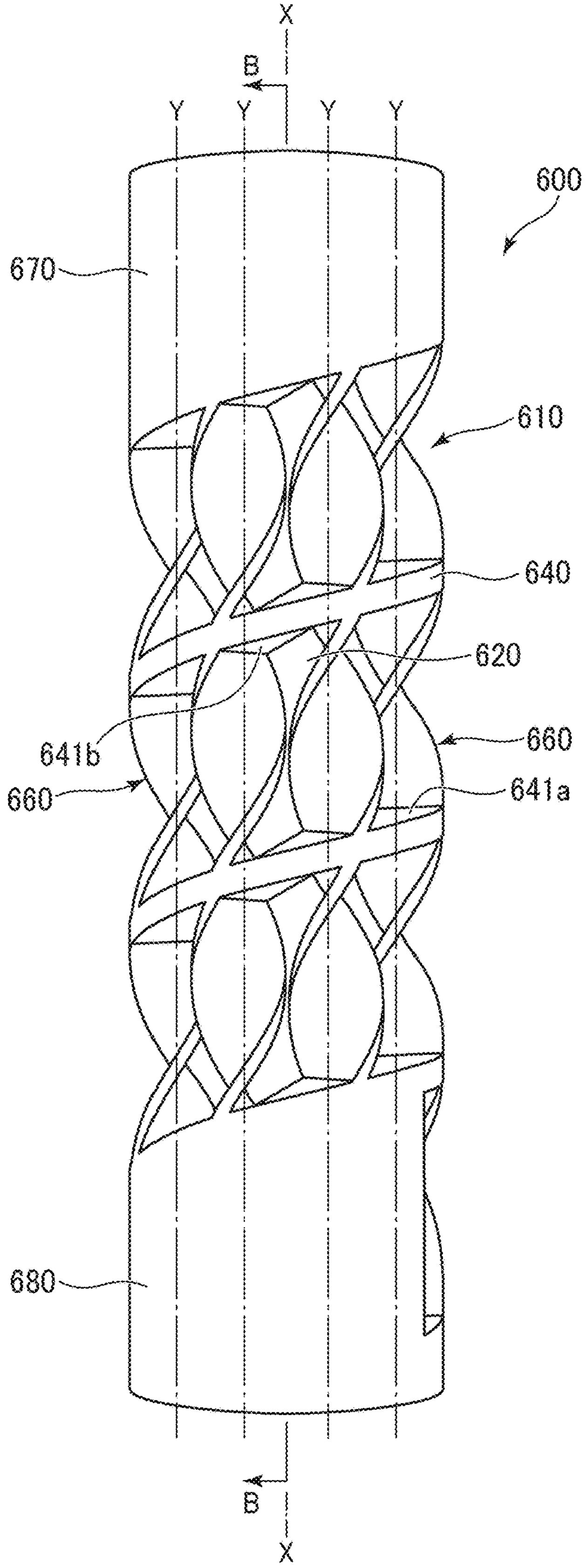
FIG. 26 is a front view of a sixth mixing apparatus according to a sixth embodiment.
Figure 27:
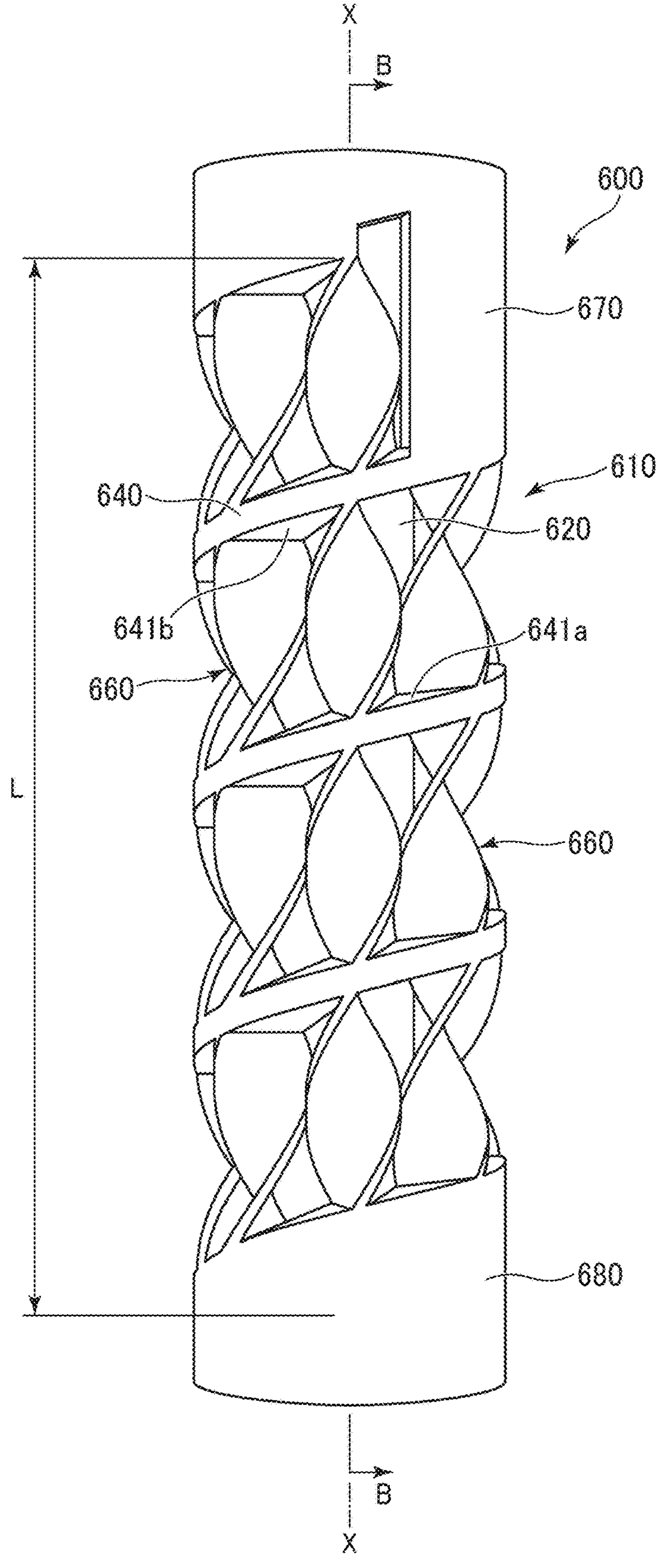
FIG. 27 is a rear view of the sixth mixing apparatus according to the sixth embodiment.
Figure 28:
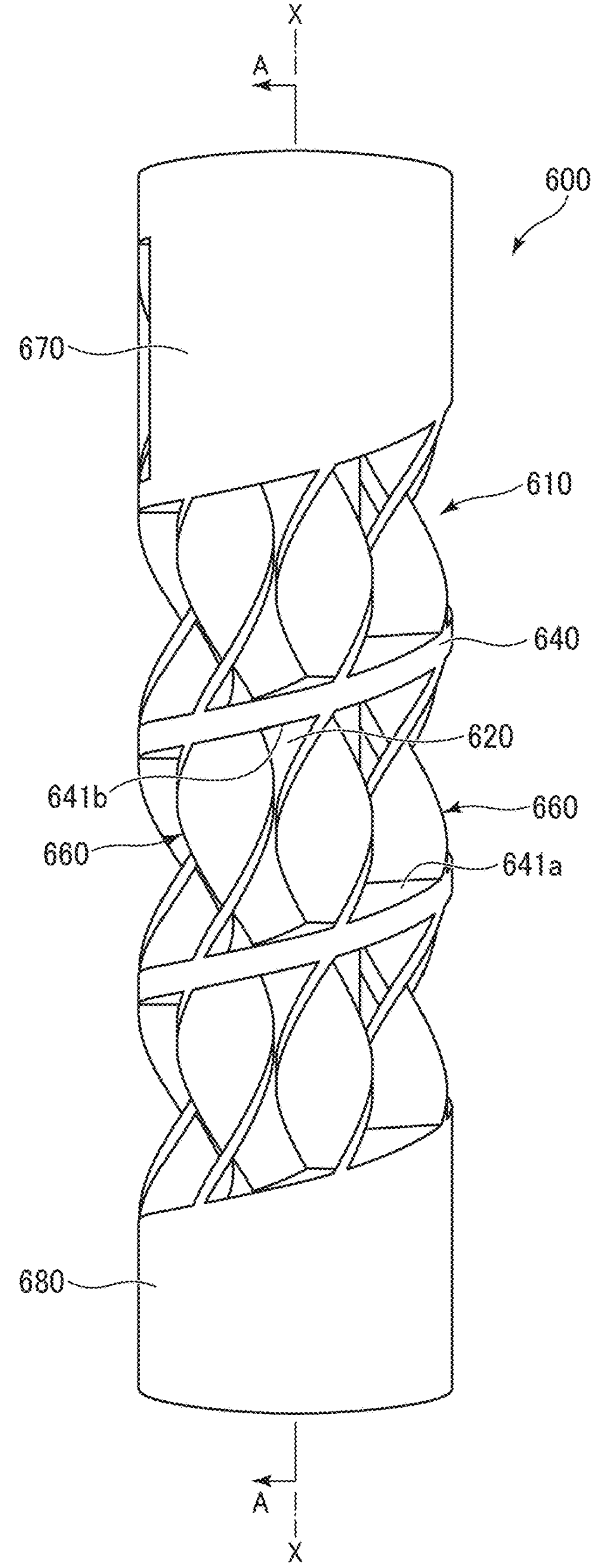
FIG. 28 is a left side view of the sixth mixing apparatus according to the sixth embodiment.
Figure 29:
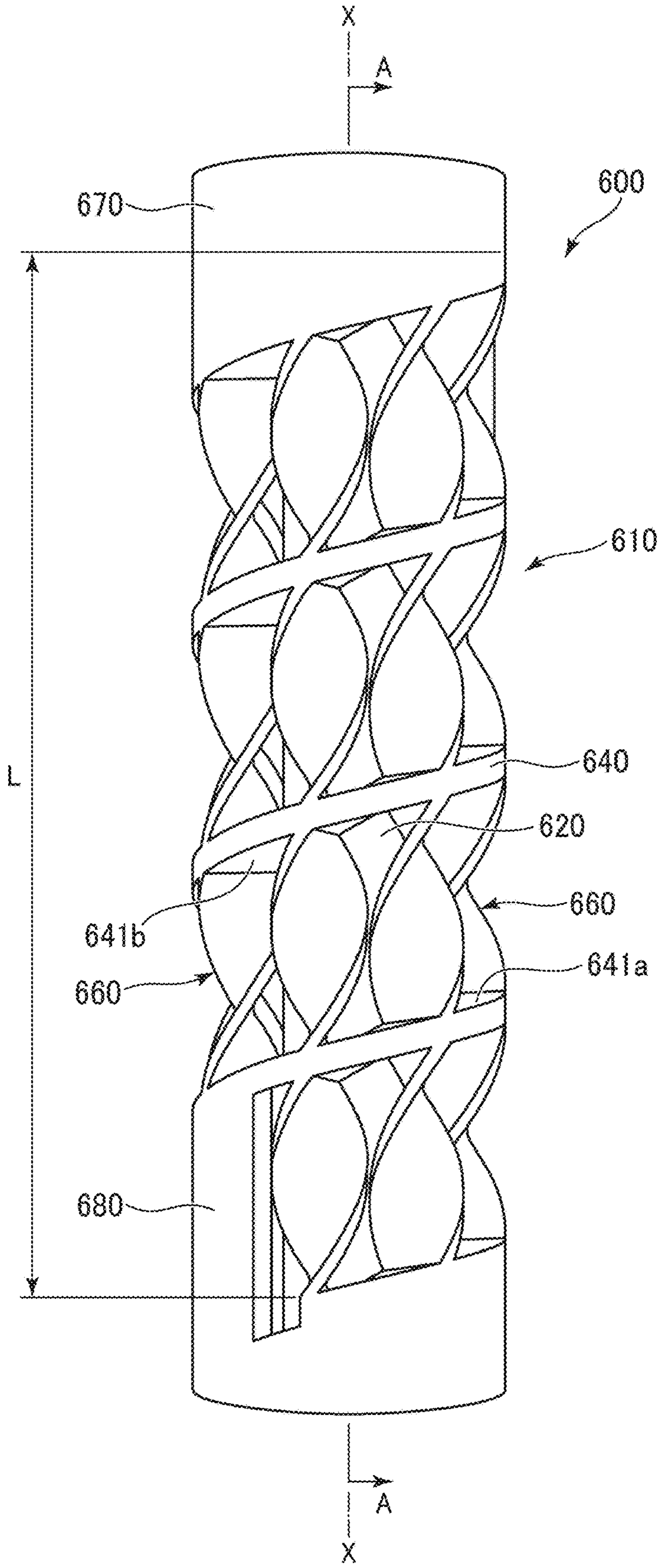
FIG. 29 is a right side view of the sixth mixing apparatus according to the sixth embodiment.
Figure 30:
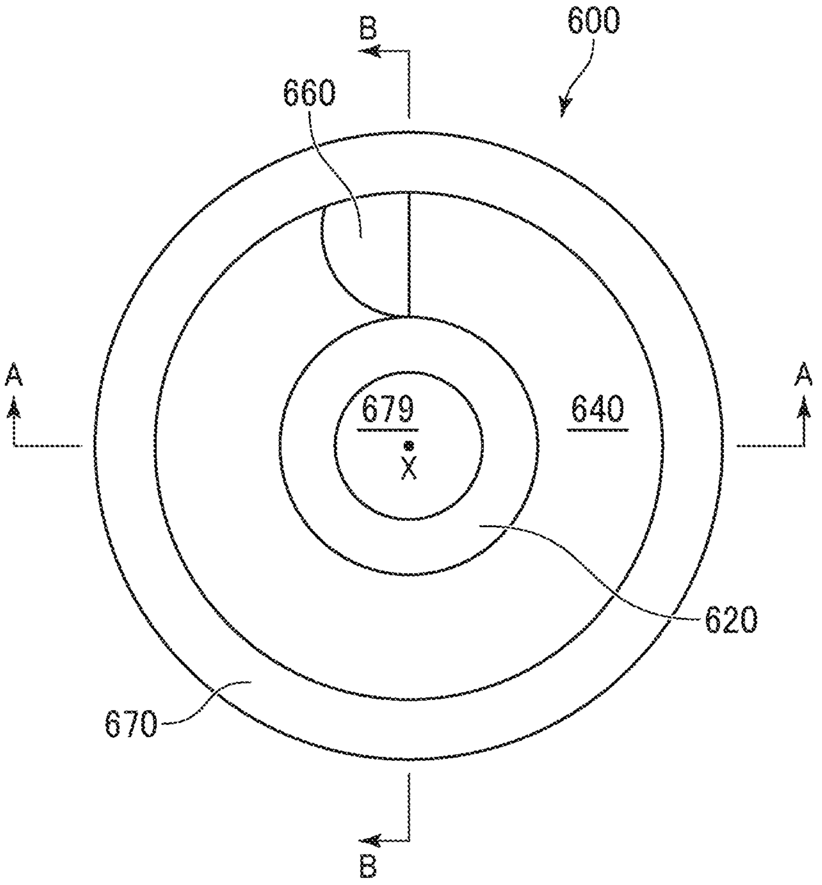
FIG. 30 is a plan view of the sixth mixing apparatus according to the sixth embodiment.
Figure 31:
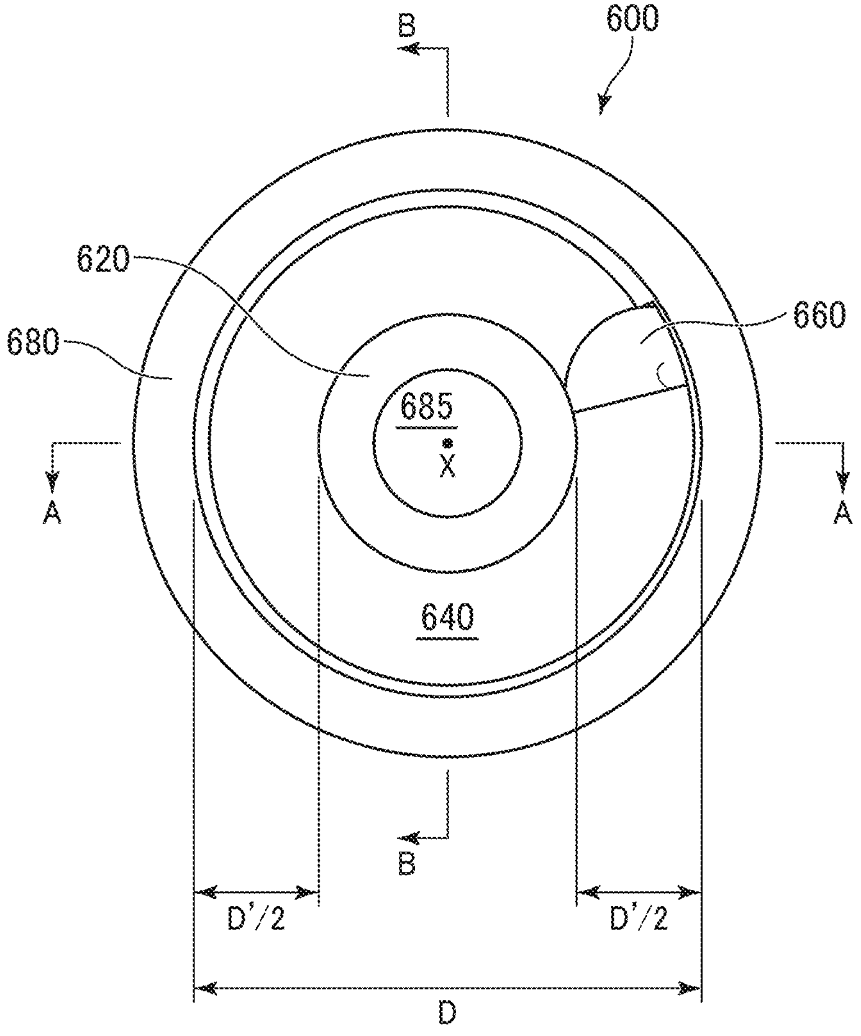
FIG. 31 is a bottom view of the sixth mixing apparatus according to the sixth embodiment.
Figure 32:
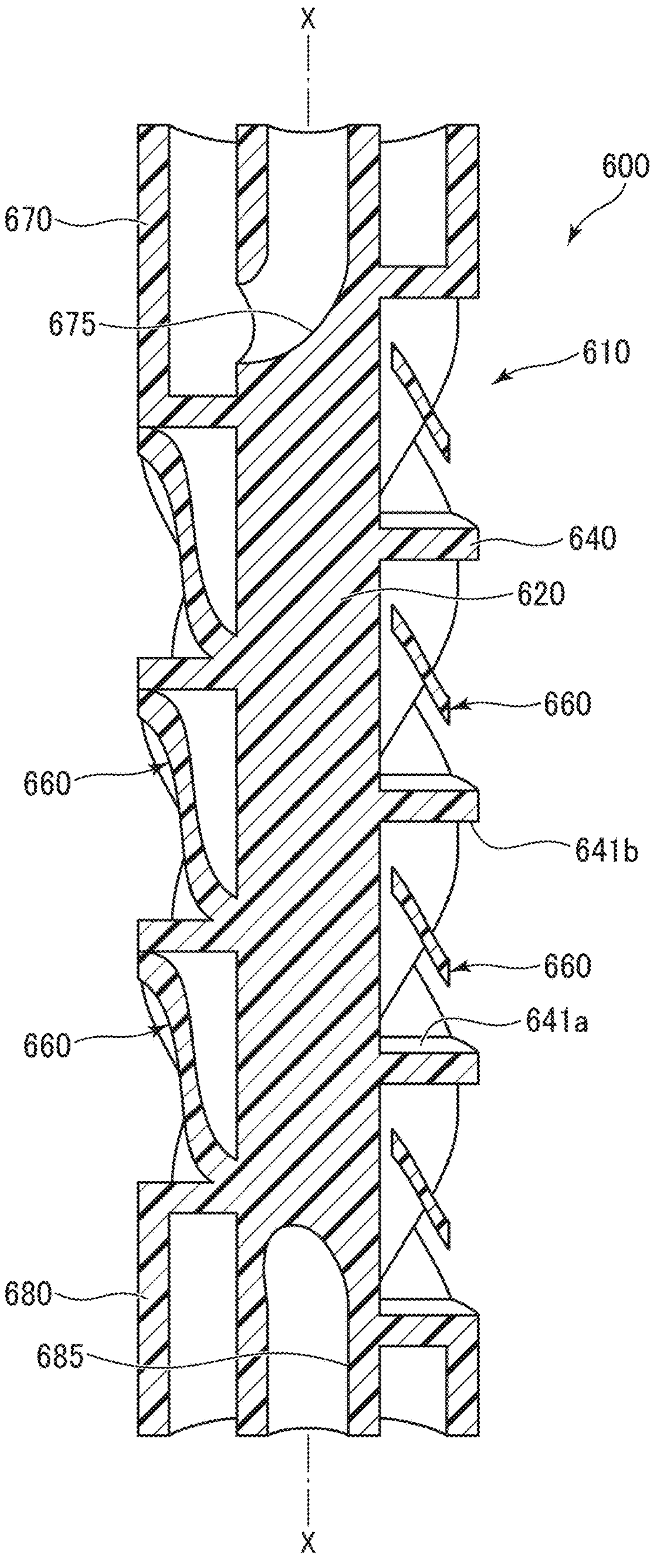
FIG. 32 is a cross-sectional view taken along a line A-A of FIG. 28.
Figure 33:
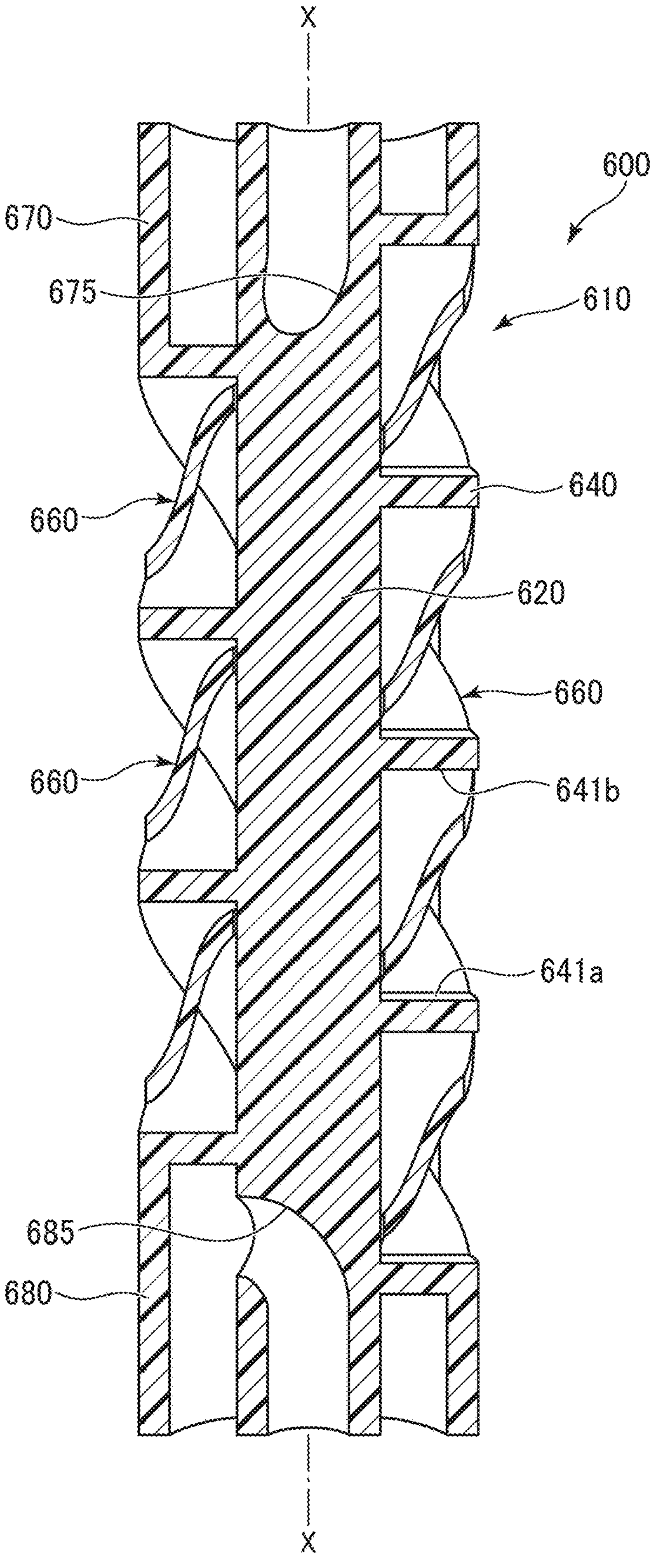
FIG. 33 is a cross-sectional view taken along a line B-B of FIG. 26.
Figure 34:
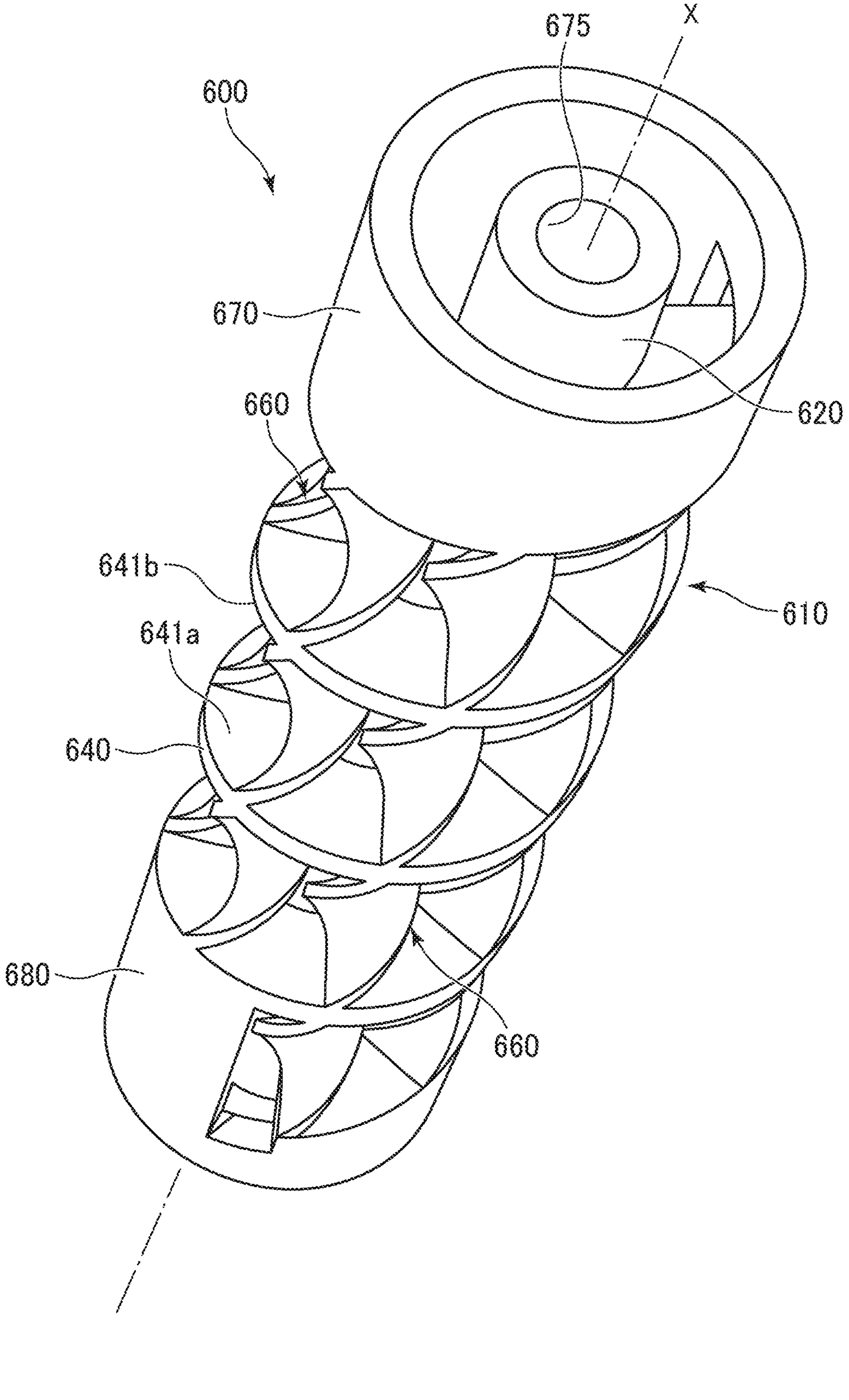
FIG. 34 is an upper right perspective view of the sixth mixing apparatus according to the sixth embodiment.
Figure 35:
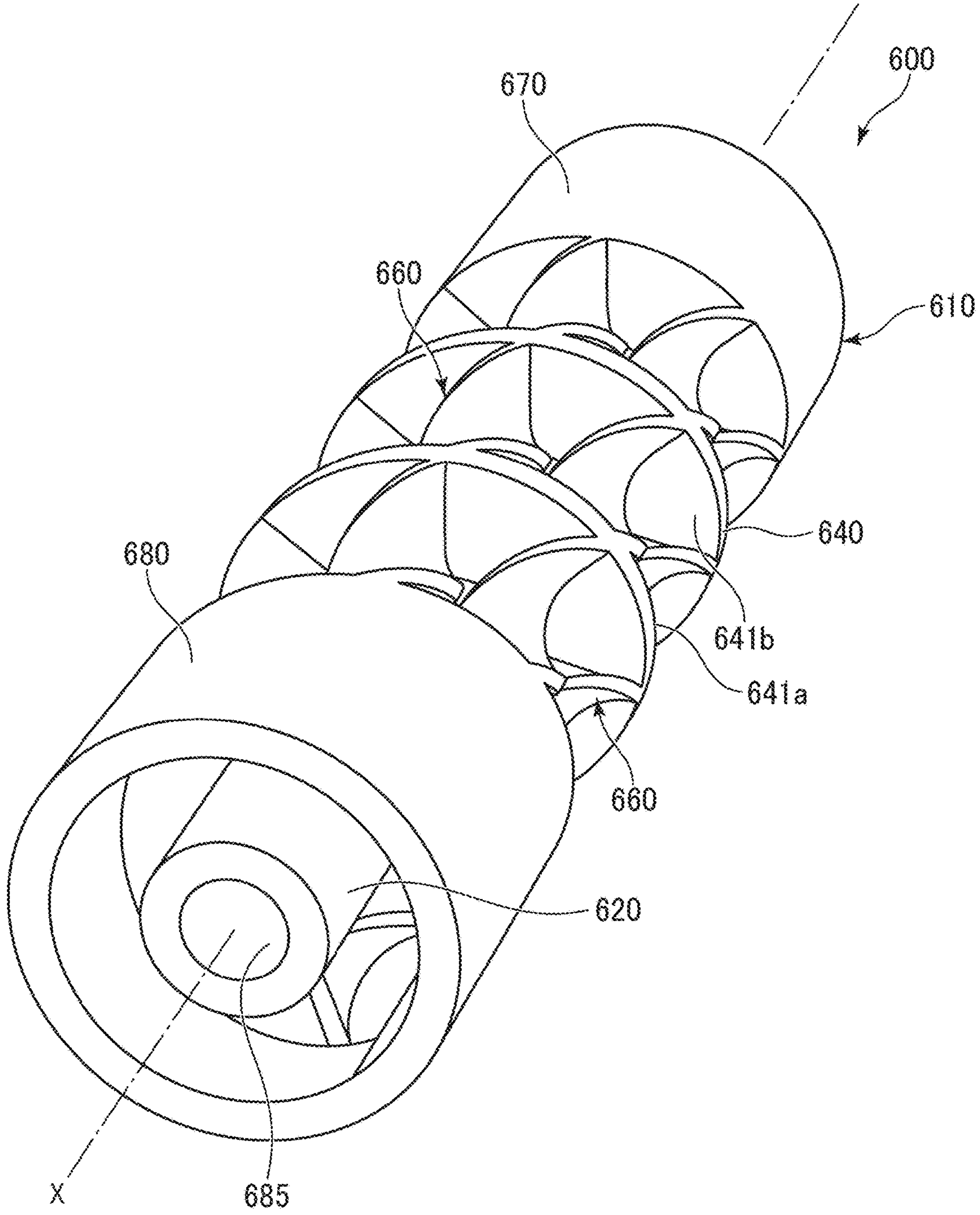
FIG. 35 is a lower left perspective view of the sixth mixing apparatus according to the sixth embodiment.

[Comparative Example 5] FIGS. 24 and 25 shows the experimental situation of Comparative Example 5. FIG. 24 shows a state in which the housing tube 190 is filled with two liquids having a viscosity of 35,000 cp. The two fluids are colored differently to make the mixed state visible. FIG. 25 shows a state in which the entire fifth mixing blade 510 is inserted into the housing tube 190. The two liquids inside the housing tube 190 are found to be in a state in which they do not completely mix at the top.

As described above, Example 5 and Comparative Example 5 shows that: when the number of second blades 560 is 12 in total, the blade twisting direction is the left-right direction, and the intervals of the blades are 1 cm, two fluids with a viscosity of 8,000 cp or less are sufficiently mixed; but the two fluids having a viscosity of 35,000 cp are not completely mixed.

The above experimental results show that, when the number of second blades is 36 in total, the blade twisting direction is any of the same direction and the left-right direction, and the intervals of the blades are 1 cm, the two fluids having a viscosity of 50,000 or less are sufficiently mixed. The results show that, when the number of second blades is 24 in total, the blade twisting direction is the same direction, and the intervals of the blades are 1 cm, two fluids with a viscosity of 35,000 or less can be sufficiently mixed. The results show that, when the number of second blades is 12 in total, the blade twisting direction is the left-right direction, and the intervals of the blades are 1 cm, two fluids with a viscosity of 8,000 or less can be sufficiently mixed. The ratio L/D is preferably 1 or more and 4 or less, 1.25 or more and 3.75 or less, 2 or more and 4 or less, and more preferably 2.50 or more and 3.75 or less. The effective ratio L/D' is preferably 2 or more and 7 or less, 2.13 or more and 6.38 or less, 4 or more and 7 or less, and more preferably 4.26 or more and 6.38 or less.

The sixth mixing apparatus 600 according to the sixth embodiment will now be described with reference to FIGS. 26 to 35. The same configurations as those of the first to five embodiments are designated by the same reference numerals, and the description thereof is to be omitted. Note that, in FIGS. 26 to 35, the housing tube 190 is omitted.

The sixth mixing apparatus 600 mainly includes a sixth mixing blade 610 and a housing tube 190, and is made of resin and/or metal. Further, the sixth mixing blade 610 mainly includes a sixth shaft 620, a sixth large blade 640, and sixth small blades 660. The size of the sixth mixing apparatus 600 is smaller than those of the mixing apparatuses according to the first to fifth embodiments. Further, the sixth large blade 640 is not too far to any of both ends of the sixth mixing apparatus 600, is provided in the axial center of the sixth mixing apparatus 600, and is spaced apart evenly from both ends.

The sixth mixing apparatus 600 mainly includes a sixth mixing blade 610 and a housing tube 190, and is made of resin and/or metal. The sixth mixing blade 610 has an axial length of about 80 mm and a diameter of about 20.8 mm. Further, the sixth mixing blade 610 mainly includes one sixth shaft 620, one sixth large blade 640, and 24 sixth small blades 660.

The sixth shaft 620 is, for example, a cylinder having a diameter of about 8.5 mm and an axial length of about 80 mm. At the respective ends of the sixth shaft 620, through holes 675 and 685 are formed so that they each are J-shaped in a cross section of the shaft and penetrate from an end surface to an outer circumferential surface (see FIGS. 32 and 33). In the sixth shaft 620, the circular holes of the through holes 675 and 685 that open on the side surfaces thereof are spaced about 120 degrees apart from each other when viewed from the axial direction.

The sixth large blade 640 is a spiral that is formed continuously around the sixth shaft 620, and that has intervals of, for example, about 5 mm in the axial direction from both ends of the sixth shaft 620. More specifically, the sixth large blade 640 is formed by winding a strip-shaped flat plate having, for example, a width of about 4 mm and a thickness of about 2 mm by about 4 and ⅓ turns around the outer circumference of the sixth shaft 620 so that the flat plate draws a spiral clockwise toward the traveling direction of the fluid to be described below. In other words, the flat plate is attached to the outer circumference of the sixth shaft 620 so that the width direction thereof protrudes from the sixth shaft 620 in the radial direction of the sixth shaft 620. The winding start and winding end of the sixth large blade 640 are located at positions spaced about 120 degrees apart from each other in the circumference of the axis of the sixth shaft 120. Further, the pitch of the sixth large blade 640 in the direction of the sixth shaft 620 is, for example, about 16 mm. In the sixth large blade 640, a part of the blades facing in the direction of the sixth shaft 620 are referred to as facing blade portions 641*a* and 641*b*. The interval between the facing blade portions 641*a* and 641*b* is about 14 mm. At the outflow side end shown on the upper side in FIG. 26, an outflow side wall 670 is formed between the sixth large blade 640 and the sixth shaft 620. At the inflow side end shown on the lower side in FIG. 26, an inflow side wall 680 is formed between the sixth large blade 640 and the sixth shaft 620. The outflow side wall 670 is a cylinder that is wound around so as to form the outer circumference of the sixth mixing blade 610, and has a wall surface extending from the facing blade portion 641*a* to the outflow side end along the sixth large blade 640 over substantially 360 degrees. The outflow side wall 670, the sixth large blade 640, and the sixth shaft 620 form a space. The through hole 675 penetrates into this space from the inner side surface of the sixth shaft 620. The inflow side wall 680 is a cylinder that is wound around so as to form the outer circumference of the sixth mixing blade 610, and has a wall surface extending from the facing blade portion 641*b* to the inflow side end along the sixth large blade 640 over substantially 360 degrees. The inflow side wall 680, the sixth large blade 640, and the sixth shaft 620 form a space. A through hole 685 penetrates into this space from the inner side surface of the sixth shaft 620.

The sixth small blade 660 is twisted clockwise around second axes Y parallel to the first axis X, toward the traveling direction of the fluid to described below. More specifically, the sixth small blades 660 each have a shape formed by twisting, for example, a strip-shaped flat plate, having a width of about 5.5 mm and a thickness of about 0.8 mm, clockwise toward the traveling direction of the fluid, by 180 degrees, which is half a turn, around the axis extending in the longitudinal direction at the flat plate center in the width direction. All the sixth small blades 660 are twisted in the same direction. Three or four sixth small blades 660 are coaxially arranged in the direction of the second axes Y. The sixth small blades 660 are provided between the facing blade portions 641*a* and 641*b* in the axial direction of the sixth shaft 620. The sixth small blades 660 are provided between the outer circumference of the sixth shaft 620 and the outer end of the sixth large blade 640 in the radial direction of the sixth shaft 620. In a state in which the sixth mixing blade 610 is inserted into the housing tube 190, both ends of a sixth small blades 660 may be in contact with or slightly in contact with the housing tube 190, but the both ends do not need to be in contact therewith. The sixth small blades 660 are attached to the facing blade portions 641*a* and 641*b* so that the width directions of their ends are in the radial direction of the sixth shaft 620. The sixth small blades 660 may be attached to the facing blade portions 641*a* and 641*b* using a manner including adhesive, welding, and/or solder. The sixth mixing blade 610 may be integrally formed by a 3D printer or the like. An interval between the adjacent sixth small blades 660 in the circumferential direction of the sixth shaft 620, that is, around the sixth shaft 620, is 0 times or more and less than 2 times the diameter of the sixth small blade 660. In other words, the sixth small blades 660 may be in contact with each other or may be spaced apart from each other. This interval in the present embodiment is, for example, about 1 mm. The sixth small blades 660 are provided along the entire length of the spiral of the sixth large blade 640, that is, over the entire length of the sixth shaft 620. The length (second blade length) L of the portion where the second blades 360 are provided in the longitudinal direction of the first shaft 120 is the second blade length L=about 70 mm in the present embodiment.

The housing tube 190 has an axial length equal to or greater than the axial length of the sixth mixing blade 610, and a cylindrical shape having an inner diameter that causes a slight friction with the outer circumference of the sixth mixing blade 610. The housing tube 190 houses the sixth mixing blade 610 in the inner circumference thereof. The inner diameter D of the housing tube 190 is, for example, about 21 mm, and the length is, for example, about 80 mm or more. The inner circumference of the housing tube 190 is in close contact with the outer circumference of the sixth mixing blade 610 so that no fluid flows in between the outer circumference of the sixth large blade 640 and the inner circumference of the housing tube 190. The ratio L/D of the second blade length L to the inner diameter D of the housing tube 190 is L/D=70/21=3.33. Further, because the effective inner diameter D' excluding the sixth shaft 620 is D'=21-8.5=12.5 mm, the effective ratio L/D'=70/12.5=5.6.

The use of the sixth mixing apparatus 600 will now be described. Two or more fluids are sent from the inflow side end portion which is one end of the sixth mixing apparatus 600. Two or more fluids passes through the inside of the through hole 685 and then flows in between the inflow side wall 680 and the sixth shaft 620, or directly flows in between the inflow side wall 680 and the sixth shaft 620. The two or more fluids then reaches the sixth large blade 640. Then, while the two or more fluids flow between the sixth large blade 640 and the housing tube 190, they collide with the sixth small blades 660 to be sheared by the adjacent sixth small blades 660 to be mixed with each other. Then, the fluids flow between the 24 sixth small blades 660, and they then reach the outflow side wall 670. After that, the fluids passes between the outflow side wall 670 and the sixth shaft 620, or passes through the inside of the through hole 675. Subsequently, the fluids are sufficiently mixed and flow out from the outflow side end portion, which is the other end of the sixth mixing apparatus 600.

The present embodiment obtains the same effect as that of the first embodiment. Further, the sixth mixing apparatus 600 according to the present embodiment is smaller and lighter than those of the first to fifth embodiments, and thereby allows the worker to mix two or more fluids while holding by the hand for a long time. Normally, when two-component waterproof urethane is applied to the roof of a building or the like, the liquids are mixed using a mixing container or the like at a place away from the construction site, and the mixed fluid is pumped to the construction site, is poured from a hose or the like to the construction surface, and is leveled on the construction surface using a rake or the like. At this time, many workers are required, such as a worker for mixing, a worker for holding and controlling a hose for pumping, a worker for flowing fluid to the construction surface, and a worker for leveling by a rake. However, if the mixing apparatus according to the present embodiment is used, the worker for flowing the fluid on the construction surface can mix the liquids by using the mixing apparatus. Consequently, the worker who mixes the fluid at a position away from the construction site is not required.

Note that any embodiment uses explanation in which the second blade is not in contact with the housing tube 190 while the first mixing blade 110 is inserted into the housing tube 190, but the second blade may be in contact with the housing tube 190.

Note that in any of the figures of the present application, the second blade may be omitted for making explanation easy, and the numbers thereof may not necessarily be the same as the numbers described in the embodiments described herein.

Note that the size, shape, and quantity of each member shown in the present description and the drawings are examples, and the present invention is not limited thereto. Further, the material of each member is an example and is not limited thereto.

Although the embodiment of the present invention has been described with reference to the accompanying drawings, it is obvious to those skilled in the art that modifications are to be made to the structure and relationship of each part without departing from the scope and spirit of the invention described.

REFERENCE SIGNS LIST

100 first mixing apparatus
110 first mixing blade
120 first shaft
140 first blade
141*a* facing blade portion
141*b* facing blade portion
160 second blade
162 second right-turn blade
164 second left-turn blade
180 second axis
190 housing tube
200 second mixing apparatus
210 second mixing blade
300 third mixing apparatus
310 third mixing blade
400 fourth mixing apparatus
410 fourth mixing blade
500 fifth mixing apparatus
510 fifth mixing blade
600 sixth mixing apparatus
610 sixth mixing blade

The invention claimed is:

1. A mixing blade, comprising:
a first blade spirally formed around a first shaft;
at least one second blade twisted around a second axis parallel to the first shaft; and,
the at least one second blade and the second axis are each provided between facing blade portions in the first blade, and the facing blade portions facing each other in a direction of the first shaft, wherein
the first shaft has a cylindrical shape, and
the at least one second blade is entirely provided between the first shaft and an outer end of the first blade.

2. The mixing blade according to claim 1, wherein
a plurality of the second blades are provided as the at least one second blade, and an interval between each of the second blades in a circumference of the first shaft is one time or more and less than two times a diameter of each second blade.

3. The mixing blade according to claim 2, wherein
the first blade is wound around the first shaft by at least 5/3 turns.

4. The mixing blade according to claim 3, wherein
the at least one second blade is twisted half a turn around the second axis.

5. The mixing blade according to claim 4, wherein
each of the second blades are twisted in the same direction.

6. The mixing blade according to claim 4, wherein
a number of the second blades is plural, and a direction in which each of the second blades is twisted is clockwise or counterclockwise with respect to the second axis.

7. The mixing blade according to claim 1, wherein the at least one second blade comprises at least 36 blades which are twisted in the same direction or which include blades twisted in the clockwise direction and blades twisted in the counter-clockwise direction about the second axis.

8. The mixing blade according to claim 1, wherein the at least one second blade is directly fixed to the first blade.

9. The mixing blade according to claim 1, wherein a pitch of the at least one second blade is different than a pitch of the first blade.

10. A mixing apparatus, comprising:
a mixing blade, comprising:
a first blade spirally formed around a first shaft;
at least one second blade twisted around a second axis parallel to the first shaft; and
the at least one second blade and the second axis are each provided between facing blade portions in the first blade, and the facing blade portions facing each other in a direction of the first shaft; and
a housing tube housing the mixing blade, wherein
the first shaft has a cylindrical shape, and
the at least one second blade is entirely provided between the first shaft and an outer end of the first blade.

11. The mixing apparatus according to claim 10, wherein a ratio L/D' of a second blade length L to an effective inner diameter D' is 2 or more and 7 or less, the second blade length L being a length of a portion where at least one second blade is provided in a direction of the first shaft, the effective inner diameter D' being an inner diameter obtained by subtracting a diameter of the first shaft from an inner diameter of the housing tube.

12. The mixing apparatus according to claim 10, wherein the at least one second blade comprises at least 36 blades which are twisted in the same direction or which include blades twisted in the clockwise direction and blades twisted in the counter-clockwise direction about the second axis.

13. The mixing apparatus according to claim 10, wherein the at least one second blade is directly fixed to the first blade.

14. The mixing apparatus according to claim 10, wherein a pitch of the at least one second blade is different than a pitch of the first blade.

* * * * *